United States Patent [19]

Williamson et al.

[11] Patent Number: 6,154,786

[45] Date of Patent: *Nov. 28, 2000

[54] METHOD FOR ASSOCIATING DATA BEARING OBJECTS WITH USER INTERFACE OBJECTS

[75] Inventors: Richard Williamson, San Francisco; Linus Upson, Half Moon Bay, both of Calif.; Jack Greenfield, Reston, Va.; Daniel Willhite, San Francisco, Calif.

[73] Assignee: NeXT Software, Inc., Redwood City, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/939,158

[22] Filed: Sep. 29, 1997

(Under 37 CFR 1.47)

Related U.S. Application Data

[63] Continuation of application No. 08/353,525, Dec. 7, 1994, abandoned.

[51] Int. Cl.$^7$ ........................................................ G06F 9/00
[52] U.S. Cl. .............................................. 709/315; 345/335
[58] Field of Search ..................................... 395/155, 701, 395/680, 683, 682; 709/300, 303, 302, 320, 316, 315, 310; 345/335

[56] References Cited

U.S. PATENT DOCUMENTS

| | | | |
|---|---|---|---|
| 4,835,685 | 5/1989 | Kun | 710/260 |
| 5,119,475 | 6/1992 | Smith et al. | 345/353 |
| 5,163,130 | 11/1992 | Hullot | 345/334 |
| 5,276,816 | 1/1994 | Cavendish et al. | 345/348 |
| 5,280,610 | 1/1994 | Travis et al. | 707/103 |
| 5,327,529 | 7/1994 | Fults et al. | 395/155 |
| 5,485,617 | 1/1996 | Stutz et al. | 395/700 |
| 5,551,035 | 8/1996 | Arnold et al. | 709/315 |
| 5,553,223 | 9/1996 | Greenlee et al. | 395/155 |
| 5,574,918 | 11/1996 | Hurley | 395/561 |

OTHER PUBLICATIONS

"Enterprise Object Framework: Building Reusable Business Objects," NeXT Computer Publication, Jul. 1994, Redwood City, California, U.S.A., pp. 1–13.

Steve Holzner, Burkard c++ Programming $2^{nd}$ Edition, 1992, Brady Publishing,

*Primary Examiner*—Alvin E. Oberley
*Assistant Examiner*—St. John Courtenay, III
*Attorney, Agent, or Firm*—The Hecker Law Group

[57] ABSTRACT

The present invention comprises a method for allowing a controlling object to interface with any number of user interface objects without requiring separate interface code for each user interface object and without restricting the user interface to certain predetermined designs. The present method provides objects called association objects that are interposed between a controlling object and each user interface object. Each kind of user interface object has a corresponding association object. The association object for a particular kind of user interface object contains code that allows the association object to interact with the specific kind of user interface object with which it is associated. Each association object also presents a standard interface to a controlling object, regardless of the kind of user interface object with which the association object is associated. The association object takes care of any conversion or translation that must be performed to convert a data value sent by the controlling object into an appropriate value that can be displayed by the user interface object. Accordingly, instead of requiring different interface code for each kind of user interface object used, a controlling object requires only a single block of interface code for communicating with all association objects, which in turn provide the user interface specific code needed for each kind of user interface object.

21 Claims, 8 Drawing Sheets

METHOD FOR ASSOCIATING DATA BEARING OBJECTS WITH USER INTERFACE OBJECTS

This is a continuation of application Ser. No. 08/353,525 filed on Dec. 7, 1994, now abandoned.

BACKGROUND OF THE INVENTION

1. Field of the Invention

The present invention relates to the field of object oriented programming languages.

2. Background Art

Object oriented programming languages are programming languages in which program elements are viewed as objects that can pass messages to each other. An object includes its own data and programming code and is internally self-reliant. The programming code of an object includes procedures or methods. The methods of an object are invoked by messages received from another object. Each object is an instance of an object class. The properties of the objects in a class are defined by a class definition. A class definition may utilize a hierarchical class structure in which objects in the class inherit properties of a parent class in addition to properties explicitly defined for the class. This inheritance property allows objects to be reused from one program to another, facilitating the sharing of programming code between different programs.

To write an application program in an object oriented programming language, a programmer identifies the real-world objects of a problem, the data and processing requirements of those objects, and the communications needed between the objects, and encapsulates these in class definitions. This process is simplified by taking advantage of the inheritance property of object classes by basing the class definitions to the extent possible on preexisting object classes.

Objects are assembled in a modular fashion to create applications. Objects communicate with one another by means of messages. In order for meaningful communications to occur, the message sent from a sending object to a receiving object must be a message to which the receiving object can respond. The sending object must therefore know the type of message to which the receiving object will respond. Similarly, if the message is one that invokes a response from the receiving object, the sending object must be prepared to accept the response.

Although objects are generally internally self-reliant, and can therefore be viewed as modules that can be assembled with other objects into a variety of application programs, the simple assembling of objects does not create a functional program. The objects must also be able to intercommunicate with each other. Although objects represent reusable code, additional code must be written to provide for the required communication between objects. For an object to communicate with a number of different objects, each of which send and receive different messages, the object must be provided with appropriate code for each of the different objects.

An example is a controlling object that bears data and/or manages a number of data bearing objects and communicates with a number of user interface objects that display data provided by the controlling object to a user and accept input from a user. FIG. 1 shows an example of the interactions between a prior art controller object 100 managing data bearing objects 105a to 105f and a graphical user interface 110. Graphical user interface 110 includes three kinds of user interface objects: a table object 120, two text field objects 130 and 140, respectively, and two check box objects 150 and 160, respectively. Each of these three kinds of user interface objects operates differently and responds to and generates different messages. Controller 100 therefore contains separate interface code for interfacing with each kind of object. Accordingly, controller 100 contains code 170 for interfacing with table objects, code 180 for interfacing with text field objects, and code 190 for interfacing with check box objects.

Certain prior art object oriented programming environments provide user interfaces with a predefined structure. These predefined structures do not allow developers the freedom to easily assemble custom user interfaces.

SUMMARY OF THE INVENTION

The present invention comprises a method for allowing a controlling object to interface with any number of user interface objects without requiring separate interface code for each user interface object and without restricting the user interface to certain predetermined designs. The present method provides objects called association objects that are interposed between a controlling object and each user interface object. Each kind of user interface object has a corresponding association object. The association object for a particular kind of user interface object contains code that allows the association object to interact with the specific kind of user interface object with which it is associated. Each association object also presents a standard interface to a controlling object, regardless of the kind of user interface object with which the association object is associated. The association object takes care of any conversion or translation that must be performed to convert a data value sent by the controlling object into an appropriate value that can be displayed by the user interface object. Accordingly, instead of requiring different interface code for each kind of user interface object used, a controlling object requires only a single block of interface code for communicating with all association objects, which in turn provide the user interface specific code needed for each kind of user interface object.

DETAILED DESCRIPTION OF THE INVENTION

In the following description, numerous specific details are set forth in order to provide a thorough understanding of the present invention. It will be apparent to one skilled in the art, however, that the present invention may be practiced without these specific details. In other instances, well-known features have not been described in detail in order not to unnecessarily obscure the present invention.

Figure 1:
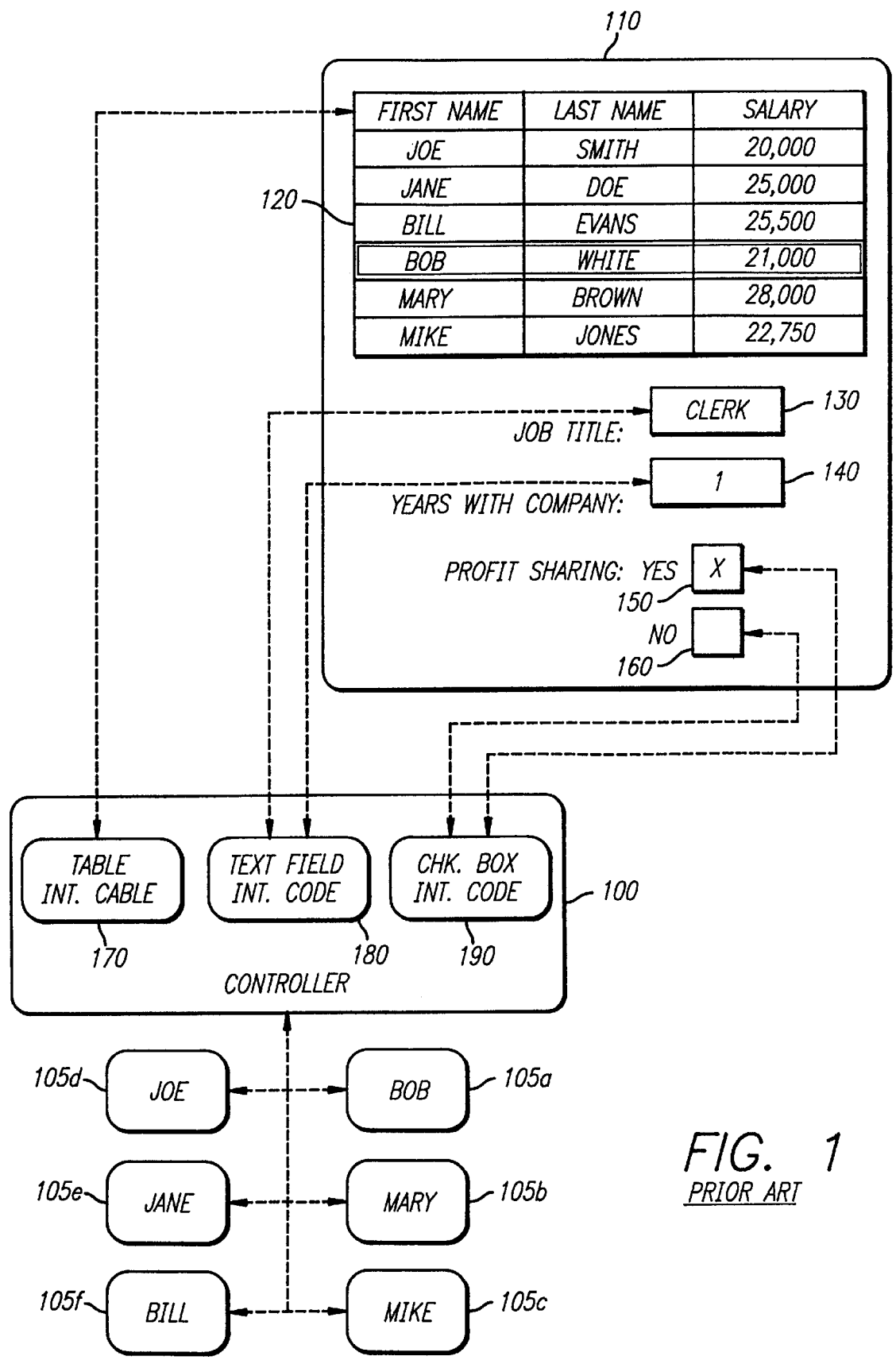
FIG. 1 is a diagram of a controller object and user interface objects of the prior art.
Figure 2:
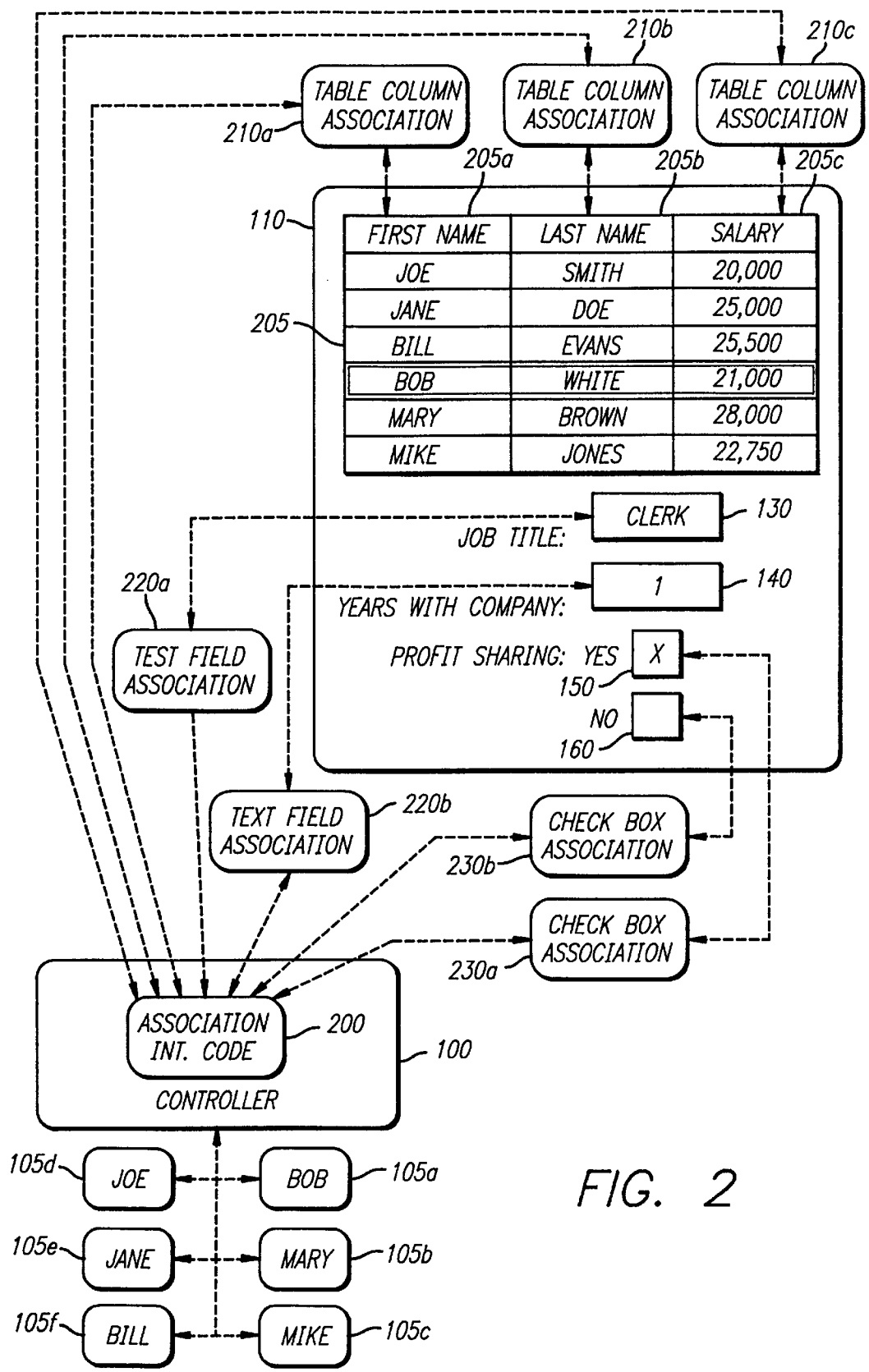
FIG. 2 is a diagram of a controller object and user interface objects in one embodiment of the present invention.

FIG. 2 is a block diagram showing the relationship between a controlling object and user interface objects in one embodiment of the present invention. FIG. 2 shows a controller object 100 that manages a number of data bearing objects 105a to 105f and a user interface 110 including a table object 120, two text field objects 130 and 140, respectively, and two check box objects 150 and 160 respectively. Controller 100 passes data between data bearing objects 105a to 105f and the various user interface objects 120, 130, 140, 150 and 160. However, instead of sending and receiving messages directly to and from the user interface objects as in the prior art system of FIG. 1, in the embodiment of the present invention shown in FIG. 2, controller 100 communicates indirectly with the user interface objects via "association" objects 210a, 210b, 210c, 220a, 220b, 230a and 230b that are interposed between controller 100 and each of user interface objects 205a, 205b, 205c, 130, 140, 150 and 160, respectively. Controller 100 sends and receives messages to and from the association objects, while the association objects send and receive messages to and from the user interface objects as well as to and from controller 100. The association objects present a consistent interface to controller 100. Accordingly, instead of having blocks of interface code for each of the three kinds of user interface objects contained in user interface 110 (i.e. table objects, text field objects, and check box objects), controller 100 needs only a single block of interface code with which it can communicate with any association object. The association objects in turn take care of any conversion or translation required between messages sent and received by controller 100 and messages sent and received by the various user interface objects.

In the embodiment of the invention shown in FIG. 2, a separate association object is utilized for each user interface object, even if there are several user interface objects of the same kind. Thus, in the embodiment of FIG. 2, separate text field association objects 220a and 220b are used for each of text field objects 130 and 140, respectively. In the same manner, separate check box association objects 230a and 230b are used for each of check box objects 150 and 160, respectively, and separate table column association objects 210a, 210b and 210c are used for each column of table 205, which in this embodiment comprises table column objects 205a, 205b and 205c, respectively. In other embodiments, table 205 may comprise a single object and be associated with a single association.

Association objects are objects provided by the present invention that can be utilized by a programmer to tie a controlling object to a variety of different kinds of user interface objects, without requiring the programmer to provide the controlling object with the code necessary to communicate with each type of user interface object. The controlling object need only be provided with the means to send and respond to standard messages. The association objects in turn take care of the message sending and receiving requirements specific to each kind of user interface object. The object oriented programming environment used with the embodiment of FIG. 2 is particularly suited for the development of data base application programs. However, the method of the present invention can also be used for non-data base applications.

The association objects of the present invention are useful particularly in a programming environment that provides a selection of user interface objects to a programmer. The present invention adds a pre-defined association for each user interface object provided by the programming environment. An application programmer wishing to display data from a controlling object can easily create an appropriate user interface by selecting the desired user interface object and linking it with the controlling object using the appropriate association object for the user interface object selected. A programmer may also develop custom user interface objects and corresponding association objects.

The purpose of a user interface is to display data output to a user and to accept data input from a user. Although the specific mechanics of how data is displayed on a user interface or how it is received from a user varies depending upon the specific type of user interface object used, the basic underlying process is the same: a user interface object receives data from a controlling object and displays it, in some manner, on the user interface; if a change is made by the user on the user interface, that change is transmitted to the controlling object. The present invention allows the controlling object to deal with these basic underlying processes, while isolating the controlling object from any more complex control requirements of particular user interface objects.

One embodiment of the present invention is used in "Enterprise Objects Framework (TM)", a set of tools and resources for the NEXTSTEP (TM) object oriented programming environment from NeXT Computer, Inc. Enterprise Objects Framework provides tools that enable program developers to design database applications that work with relational databases, that are easy to build and maintain, that communicate with other applications, and that utilize standard interface features. Enterprise Objects Framework is described in detail in *Enterprise Objects Framework Developer's Guide* (NeXT Computer, Inc., 1994) and *Enterprise Objects Framework Reference* (NeXT Computer, Inc., 1994), both of which are incorporated herein by reference.

Figure 3:
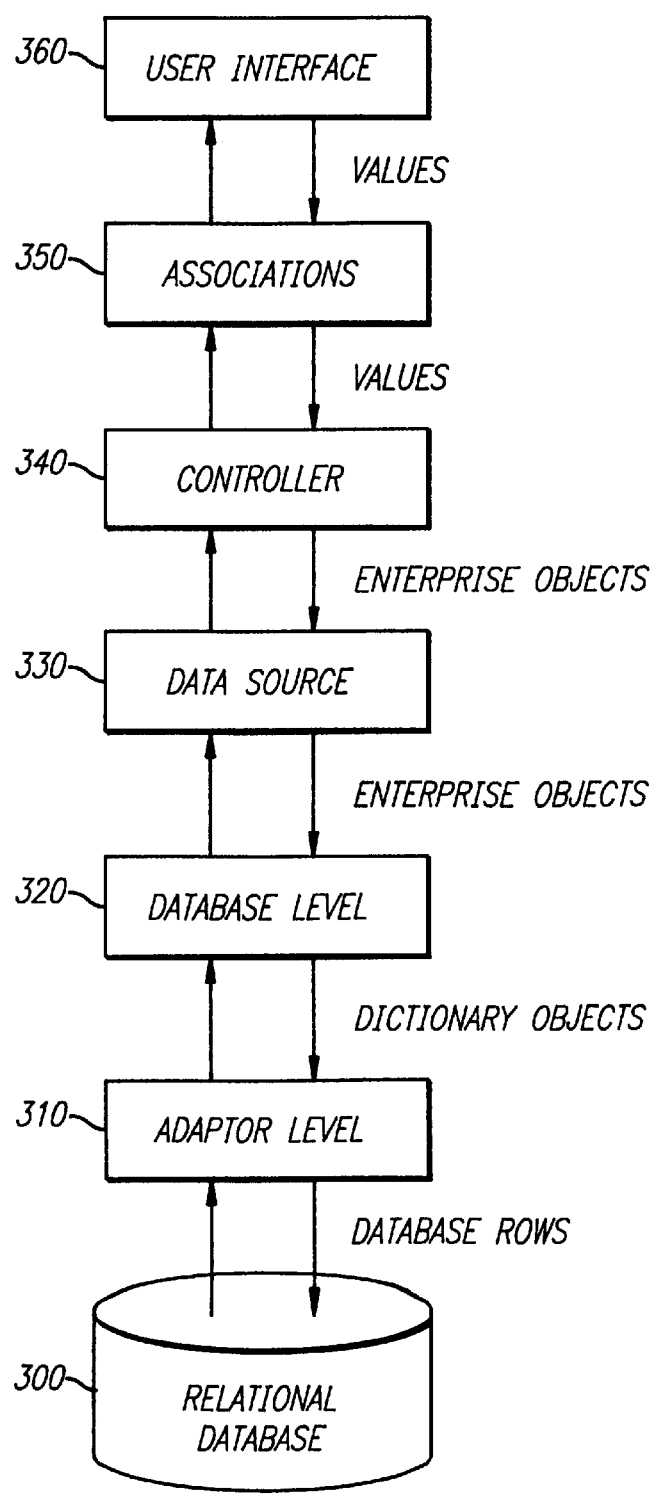
FIG. 3 is a diagram of the architecture of an Enterprise Objects Framework application.

The architecture and data flow of an Enterprise Objects Framework application is shown in FIG. 3. In the application shown in FIG. 3, data flows from a relational database 300 to a user interface 360, and vice versa, via a number of intervening modules and levels.

The flow of data from the relational database 300 to user interface 360 proceeds as follows. Data in the form of rows of data from relational database 300 are retrieved from relational database 300 to an adaptor level 310, using well-known relational database access techniques. At adaptor level 310, the raw data received from relational database 300 is packaged into "dictionary objects." Dictionary objects contain key-value pairs: each key typically represents the name of a database column, and the key's value corresponds to the data for the column of the particular row that was read from relational database 300. The key-value coding protocol used in Enterprise Objects Framework is described in Appendix A hereto. This key-value coding protocol is also described in co-pending U.S. patent application Ser. No. 08/353,524 for "Dynamic Object Communication Protocol" filed on Dec. 7, 1994, assigned to the assignee of the present invention, and incorporated herein by reference. As shown in FIG. 3, data in the form of these dictionary objects is passed from adaptor level 310 to database level 320.

Database level 320 creates "enterprise objects" from the dictionary objects. Enterprise objects are like other objects used in object oriented programming languages in that they couple data with methods for operating on that data.

However, an enterprise object has certain characteristics that distinguish it from other object classes. An enterprise object has properties that map to stored data, and an instance of an enterprise object typically corresponds to a single row or record in a database. Further, an enterprise object knows how to interact with other parts of the Enterprise Object Framework to give and receive values for its properties. The ingredients that make up an enterprise object are its class definition and the data values for The architecture and data flow of an Enterprise Objects Framework application is shown in FIG. 3. In the application shown in FIG. 3, data flows from a relational database 300 to a user interface 360, and vice versa, via a number of intervening modules and levels.

The flow of data from the relational database 300 to user interface 360 proceeds as follows. Data in the form of rows of data from relational database 300 are retrieved from relational database 300 to an adaptor level 310, using well-known relational database access techniques. At adaptor level 310, the raw data received from relational database 300 is packaged into "dictionary objects." Dictionary objects contain key-value pairs: each key typically represents the name of a database column, and the key's value corresponds to the data for the column of the particular row that was read from relational database 300. The key-value coding protocol used in Enterprise Objects Framework is described in Appendix A hereto. This key-value coding protocol is also described in co-pending U.S. patent application Ser. No. 08/353,524 for "Dynamic Object Communication Protocol" filed on Dec. 7, 1994, assigned to the assignee of the present invention, and incorporated herein by reference. As shown in FIG. 3, data in the form of these dictionary objects is passed from adaptor level 310 to database level 320

Database level 320 creates "enterprise objects" from the dictionary objects. Enterprise objects are like other objects used in object oriented programming languages in that they couple data with methods for operating on that data. However, an enterprise object has certain characteristics that distinguish it from other object classes. An enterprise object has properties that map to stored data, and an instance of an enterprise object typically corresponds to a single row or record in a database. Further, an enterprise object knows how to interact with other parts of the Enterprise Object Framework to give and receive values for its properties. The ingredients that make up an enterprise object are its class definition and the data values for the row or record to which it corresponds. The mechanism that enables an enterprise object to exchange its values with other objects is the Key Value Coding protocol referred to above and described in Appendix A. The Key Value protocol also allows an object to set its values at runtime from a dictionary, as explained below.

When an object is to be loaded with values from a dictionary, the methods and instance variables of the object are examined to determine if there is a match between keys in the dictionary and the object. This is accomplished by searching for the method "set (property)" where property is the column name or key in the dictionary. For example, with property named "lastName", the system looks for a method of the form "setLastName". If there is a match, the value of the property "lastname" can be loaded into the object using the setLastName method.

If no methods produce a match, the system looks for an instance variable whose name is the same as the property's and sets is value directly.

When a dictionary is to be loaded with values from an object, the properties of the dictionary are provided as an array. For each property, the methods of the object are examined to determine if they are of the form "property". If there is a match, the object's value for that method is returned to the dictionary. If there is no match, the instances of the object are examined. If an instance is found that matches the property, the value is returned to the dictionary. takeValuesFromDictionary The method for setting values in an object is implemented by "takeValuesFromDictionary". This method is implemented on the root object of the environment so that, in a class hierarchy system, every object inherits the method. In one embodiment, the default implementations of the key-value coding methods use the class definition as follows:

1. The key-value coding method looks for an accessor method based on the property name. For example, with a property named lastName, take ValuesFromDictionary: looks for a method of the form setLastName: (note that the first letter of the property name is made uppercase).
2. If the key-value coding method doesn't find an accessor method, it looks for an instance variable whose name is the same as the property's and sets or retrieves its value directly. In setting an instance variable, takeValuesFromDictionary: retains the new value and releases the old one.

The takeValuesFromDictionary method may be implemented as described in the pseudo code of Appendix E. The operation of takeValuesFromDictionary is illustrated in the flow diagrams of FIGS. 6A, 6B, and 6C.

takeValuesFromDictionary Flow

Figure 6A:
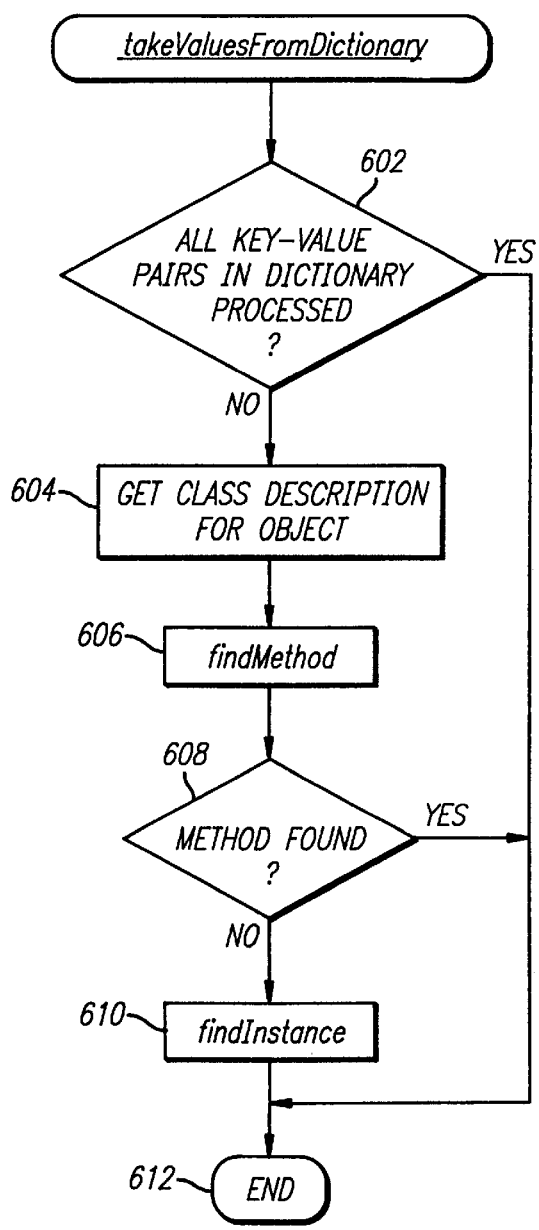
FIG. 6A is a flow diagram illustrating "takeValuesFromDictionary".

Referring first to FIG. 6A takeValuesFromDictionary is illustrated. At decision block 602, the argument "All key-value pairs in dictionary processed?" is made. This step checks to see if the object has been examined for all dictionary pairs. If the argument at decision block 602 is true, the system ends at step 612. That means that all dictionary pairs have been processed for the object, and thus the method is completed. If the argument at decision block 602 is false, not all pairs have been processed. At step 604 the class description for the object is obtained and examined. At step 606, "findMethod" is executed to determine if the object has a set method with a name that matches a property of the key-value pair. This step is illustrated in more detail in FIG. 6B.

After findMethod has been executed at step 606, the system proceeds to decision block 608. At decision block 608, the argument "method found?" is made. This step is to determine whether there has been a match between the methods of the object and the property of the key-value pair. If the argument at decision block 608 is true, a match has been found and the data can be loaded into the object. The routine of FIG. 6A ends at step 612. If the argument at decision block 608 is false, no methods match the property of the key-value pair and the system must then check the instances of the object. This is accomplished by invoking "findinstance" at step 610. This step is illustrated in more detail in FIG. 6C. After findinstance has been executed, the system ends at step 612.

findMethod Flow

Figure 6B:
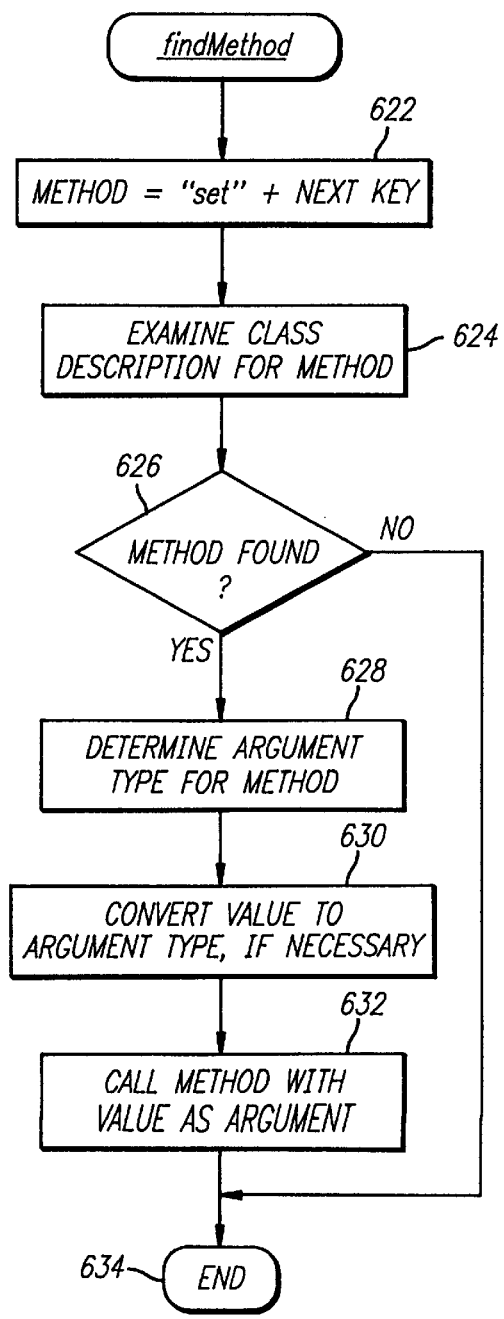
FIG. 6B is a flow diagram illustrating "findMethod".

Step 606 of FIG. 6A, "findMethod" is illustrated in more detail in FIG. 6B. The process "findMethod" is used to examine the methods of the object being examined to determine if its methods match the properties of the key-value pairs being processed. At step 622, the method to be searched for is defined as being of the type "set" plus the property of the key being processed (e.g. if the property of the key-value pair is "lastName",. then the system looks for "setLastName" ). At step 624, the class description is examined for the method that is being searched. At decision block 626, the argument "method found?" is made. This is to determine if the object contains the method that is being searched. If the argument is false, findMethod ends at step 634 and returns to decision block 626 of FIG. 6A.

If the argument at decision block 626 is true, a match has been found. The system at 628 determines the argument type for the method. At step 630, the value of the key-value pair is converted to the argument type if necessary. At step 632, the method with the value as argument is called to load the data value into the object. At step 634, findMethod ends and returns to takeValuesFromDictionary of FIG. 6A.

findInstance Flow

Figure 6C:
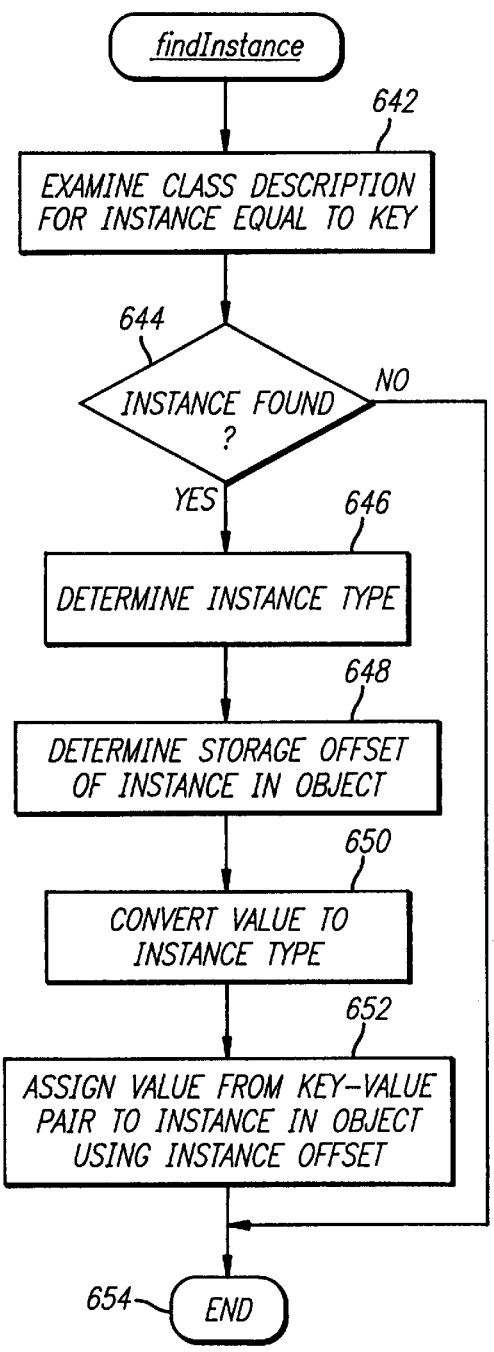
FIG. 6C is a flow diagram illustrating "findInstance".

Step 610 of FIG. 6A, "findInstance",. is illustrated in FIG. 6C. In the preferred embodiment of the present invention, the methods of an object are examined first when attempting to load data. If no suitable methods are found, the instance variables are examined using "findInstance". At step 642, the class description of the object is examined to determine if there is an instance equal to the key property of the key-value pair being processed. At decision block 644, the argument "instance found?" is made. If the argument is false, that is if no instances match the property, the findinstance process ends at step 644 and returns to step 612 of FIG. 6A.

If the argument at decision block 644 is true, a match between and instance variable and the key-value property has been found. The system then at step 646 determines the instance type. At step 648, the storage offset of the instance in the object is determined. At step 650, the value of the keyvalue pair being examined is converted to the object's instance type. At step 652, the value from the key-value pair is assigned to the instance in the object using the previously determined instance offset. At step 654, findinstance ends and returns to step 612 of FIG. 6A.

valuesForKeys

The method for loading a dictionary with values from an object is "valuesForKeys". The class definitions for valuesForKeys is as described above for "takeValuesForDictionary". The valuesForKeys method may be implemented as described in the pseudo code of the Appendix. The operation of valuesForKeys is illustrated in the flow diagrams of FIGS. 7A, 7B, and 7C.

valuesForKeys Flow

Figure 7A:
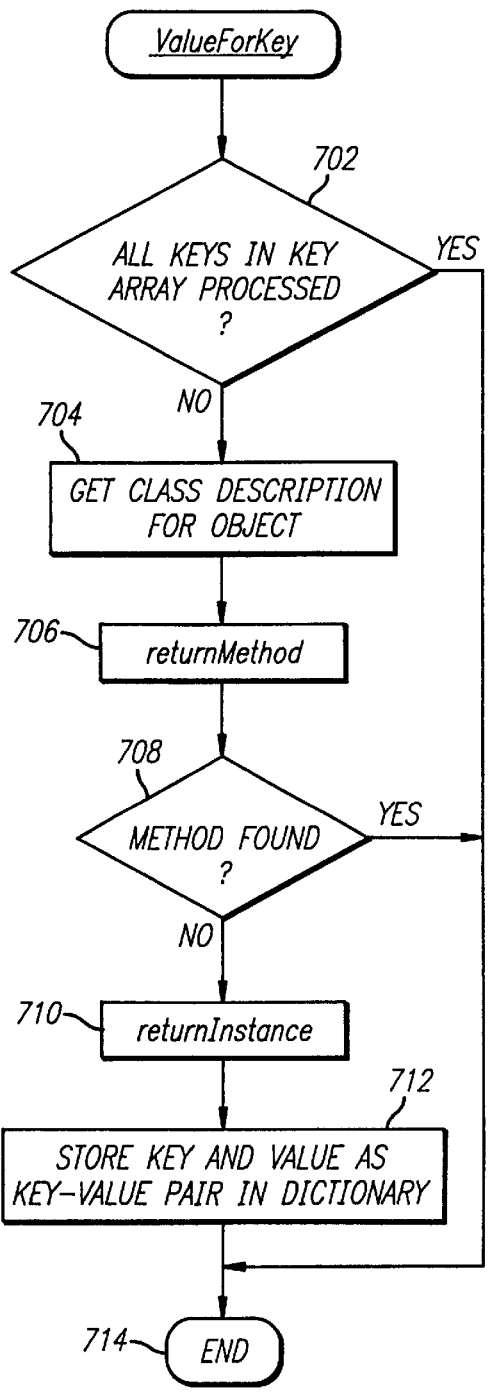
FIG. 7A is a flow diagram illustrating "valuesForKeys".

Referring first to FIG. 7A, valuesForKeys is illustrated. When valuesForKeys is invoked, it is to take data from an object and load it into a data destination (e.g. a relational database). The properties of the keys of the key-value dictionary of the data destination are put into a key array. At decision block 720, the argument "All keys in key array processed?" is made. If the argument is true, all array entries have been processed and the method is over, the process ends at step 714. If the argument is false, the next key in the key array is processed. At step 704, the system gets the class description for the object. At step 706, "returnMethod" is executed to determine if the object has any methods (e.g. setValue, getvalue, etc.) that match the key property. This step is illustrated in more detail in FIG. 7B.

After returnMethod has been executed at step 706, the system returns to decision block 708. At decision block 708, the argument "method found?" is made. This step is to determine whether their was a match between any of the methods of the object and the key property. If the argument at decision block 708 is true, a match has been found and the data can be loaded into the data destination. The process then ends at step 714. If the argument at decision block 708 is false, no methods match the key property. The system then checks the instance variables for matches. This is accomplished by invoking "returninstance" at step 710. This step is illustrated in more detail in FIG. 7C. After returninstance has been executed, the process stores the key and returned value as a key-value pair in the key-value dictionary. At step 714, valuesForKeys ends.

returnMethod Flow

Figure 7B:
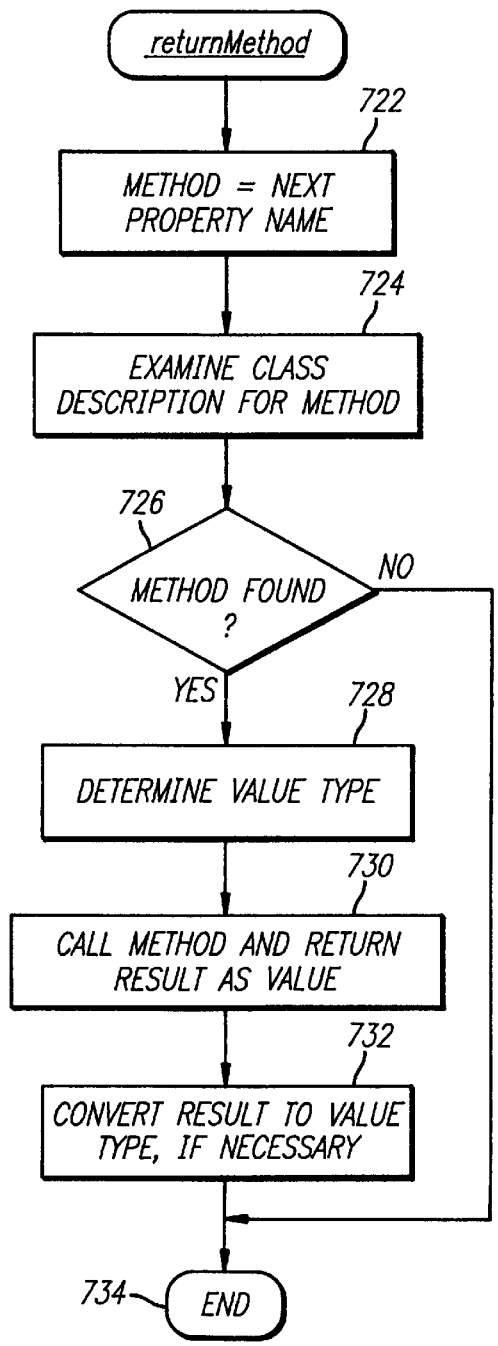
FIG. 7B is a flow diagram illustrating "returnMethod".

Step 706 of FIG. 7A, "returnMethod",. is illustrated in FIG. 7B. The process "returnMethod" is used to examine the methods of the object to determine if any; of its methods match the property of the key property array value being processed. At step 722, the method to be searched for is made defined as one having the current key property. At step 724, the class description is examined for the defined method. At decision block 726, the argument "method found?" is made. If the argument is false, there is no match, returnMethod ends at step 734 and returns to valuesForKeys of FIG. 7A.

If the argument is true, at step 728, a match has been found. At step 728, the value type of the method is determined. At step 730, the method is called and returns the result as value. At step 732, the process converts the value to value type, if necessary, and the value can be loaded into the data destination. The process returnMethod ends at step 734.

returnInstance Flow

Figure 7C:
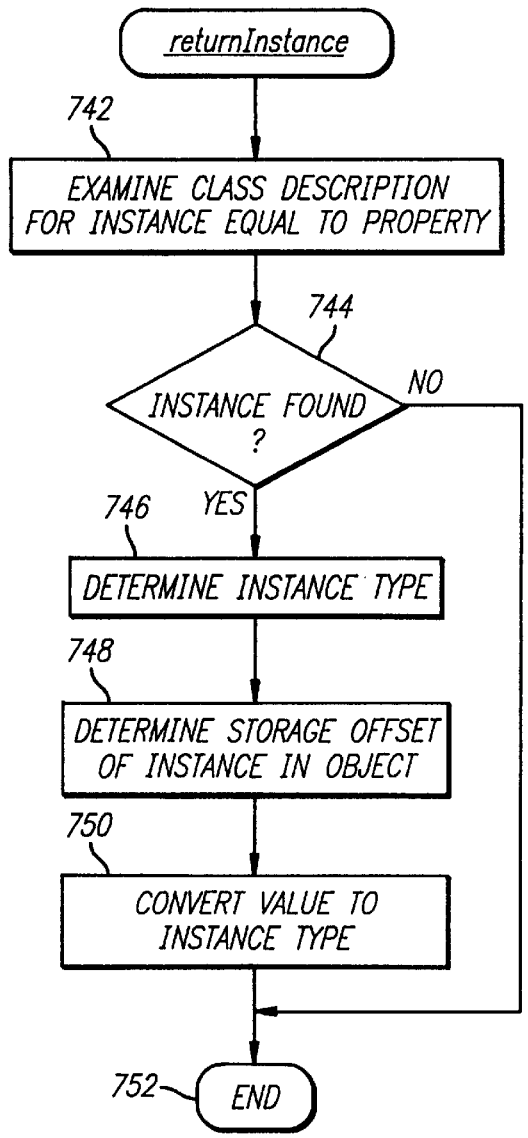
FIG. 7C is a flow diagram illustrating "returnInstance".

Step 710 of FIG. 7A, "returninstance" is illustrated in FIG. 7C. In the preferred embodiment of the present invention, this process is invoked only when no matching methods have been found for a key property being processed. At step 742, the class description is examined to determine if there is an instance variable that matches the key property. At decision block 744, the argument "instance found?" is made. If the argument is false, no matches have been found, the returnInstance process ends at step 752 and returns to valuesForKeys of FIG. 6A.

If the argument at decision block 744 is true, there is a match of an instance variable and the key property. At step 746, the type of the instance variable is determined. At 748, the storage offset of the instance variable in the object is determined. At step 750, the value of the instance is converted to instance type and can be loaded into key-value pair of the dictionary of the data destination. At step 752, returninstance ends and returns to valuesForKeys of FIG. 7A.

Returning to FIG. 3, the enterprise objects created at database level 320 are passed from database level 320 to data source 330. Data source 330 is an object that has the ability to fetch, insert, update and delete enterprise objects. Changes made by data source 330 to an enterprise object are passed down via database level 320 and adaptor level 310 to relational database 300 so that a corresponding change is made to the database for a change made to an enterprise object.

Data source 330 supplies enterprise objects created at database level 320 to controller 340. As shown in FIG. 3, controller 340 transports data in the form of values from the enterprise objects to user interface 360 via association objects 350. Controller 340 coordinates the values displayed in the user interface with the corresponding enterprise object values. When enterprise objects are modified, controller 340 tells data source 330, which is responsible for propagating changes to relational database 300. A description of the controller object class provided by Enterprise Objects Framework is attached hereto as Appendix B.

Movement of data in the architecture shown in FIG. 3 is bi-directional. Changes made by a user to data values displayed on user interface 360 propagate to relational database 300 in the opposite direction as data from database 300 propagates to user interface 360.

As mentioned above, the mechanism by which data moves through an Enterprise Object Framework application is a key-value coding informal protocol. Regardless of their characteristics, objects that conform to the key-value coding protocol (such as enterprise objects) have a common characteristic: their data is accessed by other objects in the form of key-value pairs. Key-value coding methods enable an object to receive values for its keys and to give out its keys'values to other objects.

Figure 4:
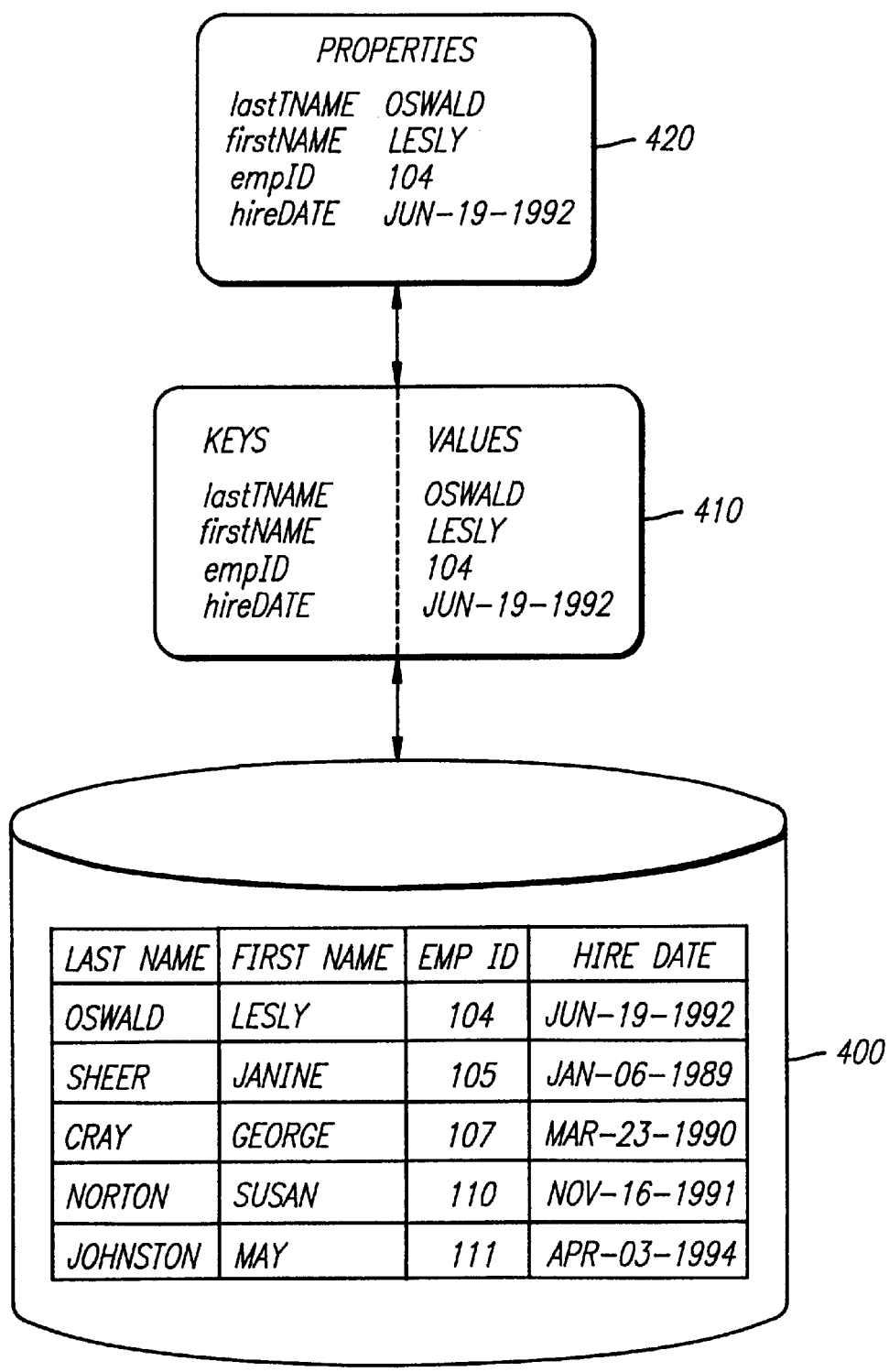
FIG. 4 is a diagram showing the relationship between data contained in a database and data contained in dictionary and enterprise objects in one embodiment of the present invention.

By using key-value coding, different types of objects can pass their values to each other, thereby transporting data through the different layers shown in FIG. 3. FIG. 4 shows how the properties in an enterprise object 420 correspond to the key-value pairs in a dictionary 410, and how both in turn correspond to a row in a relational database 400. Enterprise object properties and dictionary keys (such as firstname and lastname shown in FIG. 4) map to columns in the database; the value for each key (for example "Lesly" and "Oswald", respectively) matches the column's value for the corresponding row.

User interface 360 of FIG. 3 typically contains a number of user interface objects such as pop-up lists, forms, text fields, and tables. These user interface objects display the values of keys of enterprise objects, and, if the values are edited in the user interface, communicate the changes back to the enterprise objects.

The interface between user interface objects and related enterprise objects is provided by controller object 340 and association objects 350 of FIG. 3, which together may be viewed as an interface layer between enterprise objects and user interface objects.

The primary actor in the interface layer is controller 340. Controller 340 uses association objects to mediate between enterprise objects and user interface 360. Each association object links a single user interface object to a class property name (key) in an enterprise object or objects managed by the controller. The property (key) value is displayed in the user interface object with which the association object is linked. Enterprise Objects Framework provides a number of predefined association objects and associated user interface objects to the developer. Appendix C contains descriptions of association objects provided by Enterprise Objects Framework. Specific association objects provided by Enterprise Objects Framework include EOAssociation (an abstract association object class) and the subclasses EOActionCellAssociation, EOColumnAssociation; EOControlAssociation; EOImageAssociation; EOMatrixAssociation, EOPopUpAssociation; EOQualifiedAssociation; and EOTextAssociation.

As described above, an association object ties a single user interface object (such as a text field) to a value corresponding to a key in an enterprise object or objects managed by the controller object. For example, a text field may display the value "Jun-19-1992" for the key "hireDate" of enterprise object 420 of FIG. 4. An association object is provided with an appropriate key to enable it to obtain data from a data bearing object using a key-value coding protocol. By means of association objects and their keys and the key-value coding system, a controller can set data from data bearing objects to user interface objects and retrieve data from user interface objects into data bearing objects. The user interface objects, association objects, and keys can be assembled without data, and be archived for later use with an application program. By using the key-value coding protocol, these objects can be assembled and configured ahead of time and made to execute at run time with no compilation.

One of the functions performed by association objects, if needed, is to convert values extracted by the controller from an enterprise object and passed to an association object to a type that can be displayed by the corresponding user interface object. In a similar manner, a data source converts edited values returned to the controller from an association object to an appropriate value class that can be applied by the data source to the corresponding enterprise object.

A controller works closely with it's association objects to ensure that values displayed in the user interface remain synchronized with the corresponding enterprise object values. When an enterprise object value changes, the controller tells its association objects. Conversely, when an association object is notified of a change in a displayed value by its user interface object, the association object informs its controller of the change that occurred.

Figure 5:
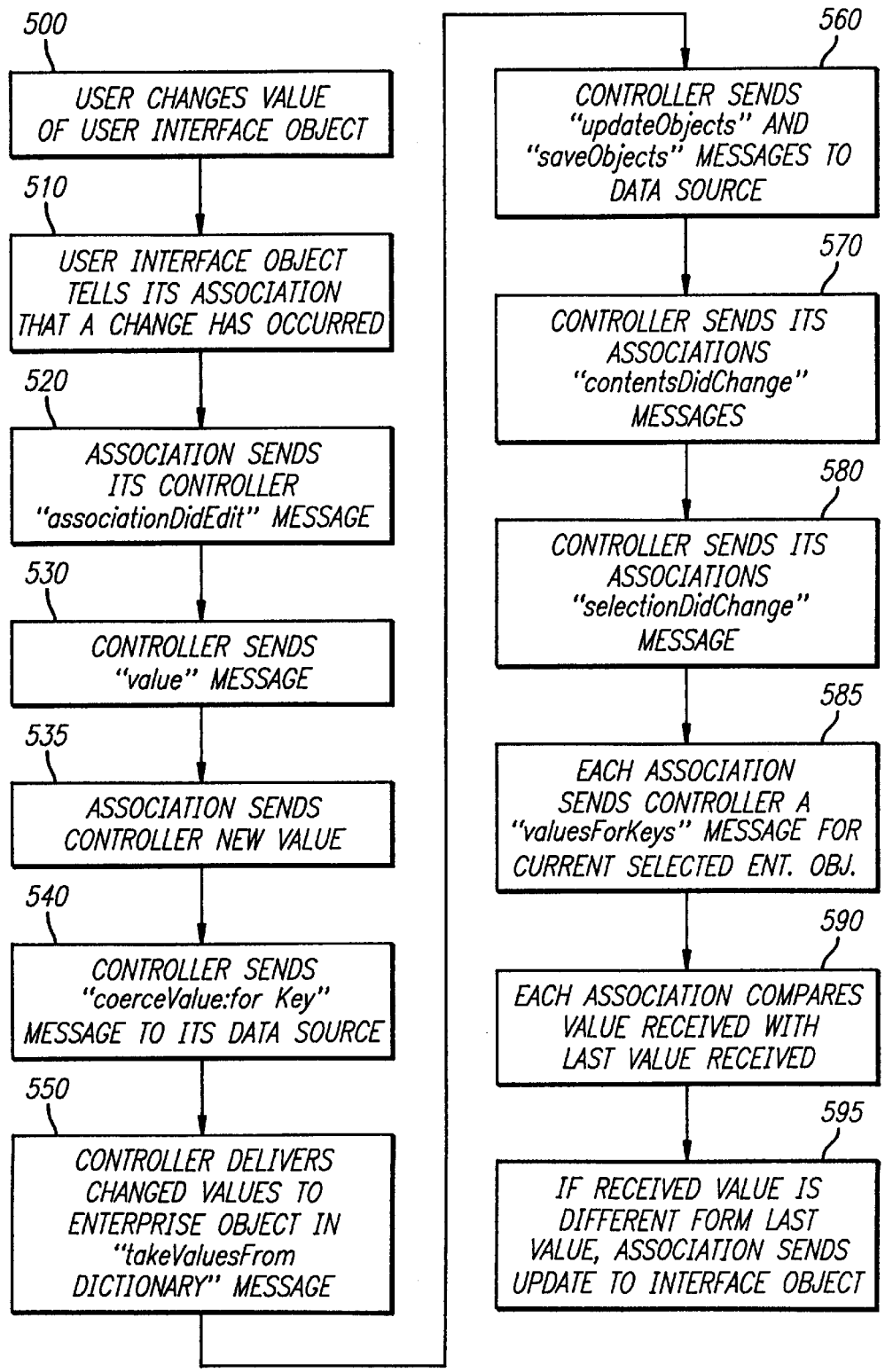
FIG. 5 is a flow chart for one embodiment of the present invention.

FIG. 5 shows the sequence of steps that occur when the value displayed by a user interface object has changed. The sequence starts when a user changes the value of a displayed user interface object at block 500. For example, a user may change the hire date of "Jun-19-1992" displayed in a text field object for enterprise object 420 of FIG. 4 to a new date of "Jun-19-1991" by typing the new date in the text field object displayed on the user interface.

In response to this change, at block 510 of FIG. 5, the user interface object sends its association object (in this embodiment there is a one-to-one correspondence between user interface objects and association objects) a message that this user initiated change has occurred. The association object, in turn, at block 520, notifies its controller of the change by sending the controller a "associationDidEdit" message. An "associationDidEdit" message informs the controller that a change has occurred, but does not include the new value. To obtain the new value, the controller sends the notifying association object a "value" message at block 530, upon which the association object returns the new value at block 535.

After receiving the new value, the controller sends its data source a "coerceValue:forKey;" message at block 540. This message causes the data source to convert the new value received from the association object to a value class type that can be used by the corresponding enterprise object. The controller then delivers the new, converted value to the enterprise object by means of a "takeValuesFromDictionary:" message at block 550. "takeValuesFromDictionary" is a standard message that is part of the key-value coding protocol used to transfer data between objects in the Enterprise Objects Framework.

Next, the controller sends "updateObject:" and "saveObjects" messages to its data source at block 560. In response to these messages, the data source causes the data in the database to be updated and stored to reflect the new value.

Although the above sequence of steps has been described as taking place in without buffering, buffering techniques that are well known in the art can be used at various steps along the sequence. For example, changes made in the user interface objects can be buffered before being sent to update the enterprise objects, or changes to the enterprise objects can be made without buffering while the sending of the changes to the data source is buffered.

Since each user interface object has a corresponding association object, and since a user interface typically has a number of user interface objects, a controller will typically be associated with a number of association objects. Further, a number of different user interface objects may display a value for the same key of an enterprise object. As a result, if a value displayed by one user interface object is changed by a user, that change may be reflected in other user interface objects. Accordingly, after the value in an enterprise object has been changed in response to a new value entered by the user, the controller sends all of its association objects "contentsDidChange" messages at block 570. In addition, when the change in value also causes the selected enterprise object to change (a "selected" enterprise object is the current object for which values are displayed in the user interface, or, in the case where a user interface object displays values for multiple enterprise objects simultaneously, such as a table, the selected enterprise object is the object whose values are highlighted), the controller also sends all of its association objects a "selectionDidChange" message at block 580. This enables each association object to display values for the currently selected enterprise object, or highlight the values for the selected enterprise object if the user interface object associated with the association object displays values for multiple enterprise objects.

A "contentsDidChange" message received by an association object constitutes a signal to the association object that the value displayed by its user interface object may have changed. To determine whether the change that occurred affects the value that an association object is displaying in its user interface object, at block 585, each association object sends the controller a "valuesForKeys" message to obtain the current value for the key that is displayed in the association object's user interface object. "valuesForKeys", like "takeValuesFromDictionary", is a standard message that is part of the key-value coding protocol used to transfer data between objects in the Enterprise Objects Framework. When an association object receives the current value for its user interface object, it compares the current value with the last value that it received (which ordinarily would also be the value being displayed by its user interface object) at block 590. If the current value is different from the last value, the association object sends a message to its user interface object to update the displayed value to the new value at block 595.

From the point of view of the controller, all association objects look the same: the controller communicates with all association objects using the same set of standard messages. The process shown in FIG. 5, particularly from block 520 onward, thus applies in general to any change in value made to any user interface object. The way in which a user interface object interacts with its association object, and the specific messages that are used for communications between an association object and its user interface object, however, will vary depending upon the characteristics specific to a particular user interface object. Accordingly, the particular manner in which the steps shown in blocks 500 and 510 are performed may vary from association object to association object.

In addition to informing its association objects when its enterprise objects or currently selected enterprise object have changed, a controller in Enterprise Objects Framework uses a "endEditing" method to order its association objects to finish editing. Before a controller can perform certain operations (such as fetching, inserting a new enterprise object, or setting an undo mark) it must collect any new edits from its association objects. When the controller sends "endEditing" messages to its association objects, they finish editing, relinquish first responder status, and notify the controller of any changes with "associationDidEdit:". The protocol used by a controller to send notification messages to its association objects is described in Appendix D.

In addition to providing a number of pre-defined user interface objects and association objects, Enterprise Objects Framework allows a developer to create custom user interface objects and associated custom association objects. The "EOAssociation" object described in Appendix C can be used by a developer as a basis for defining a custom association object.

Thus a method for associating controlling and data bearing objects with user interface objects has been presented. Although the present invention has been described with respect to certain example embodiments, it will be apparent to those skilled in the art that the present invention is not limited to these specific embodiments. For example, instead of communicating with data bearing objects via a controller object, the association objects of the present invention may communicate directly with data bearing objects. Instead of using a separate association object for each user interface object, an association object may be associated with more than one user interface object. The specific messages sent and received by association objects and data bearing and data controlling objects can vary from the specific messages described herein. The specific steps and sequences of steps described herein may be configured by a user and may vary from one embodiment to another. Other embodiments incorporating the inventive features of the present invention will be apparent to those skilled in the art.

Appendix A

Enterprise Objects Framework Release 1.0 Copyright © 1994 by NeXT Computer, Inc. All Rights Reserved.

EOKeyValueCoding
(informal protocol)

Category Of: NSObject
Object

Declared In: eoaccess/EOKeyValueCoding.h

Category Description

The methods of the EOKeyValueCoding category form the main transmission mechanism for data in the Enterprise Objects Framework, in which the properties of an enterprise object are accessed indirectly by name, rather than directly through invocation of an accessor method or an instance variable. Thus, any object can represent its state as an NSDictionary whose keys are the names of its properties.

The method for setting an enterprise object's value is takeValuesFromDictionary, which uses the keys of the dictionary passed in to identify the new values for the object's properties. The method for getting values is valuesForKeys, which extracts the value for each key in the array passed in and returns the key-value pairs in a dictionary. These two methods are defined for both NSObject and Object to use the accessor methods normally implemented by objects (or to access instance variables directly if need be), so that you don't have to write special code simply to integrate your enterprise objects into the Framework. Your enterprise objects can also override the default implementations to do custom processing of values as they enter and leave the Framework.

Default Implementations

The Framework provides default implementations of the key-value coding methods use the class definition of the receiver's class. These implementations are general enough that your enterprise object classes should rarely need to override either key-value coding method.

The implementations in EOGenericRecord are quite simple: They simply store or retrieve the properties in a dictionary object held by the EOGenericRecord. NSDictionary and NSMutableDictionary, though not suitable for use as enterprise objects, meaningfully implement these methods by directly accessing their key-value pairs. The implementations for Object and NSObject, on the other hand, dynamically handle the keys requested based on the definition of the receiver's class. These implementations are general enough that your enterprise object classes should rarely need to override either key-value coding method.

In accessing an object's property, the default implementations of the key-value coding methods use the class definition as follows:

1. The key-value coding method looks for an accessor method based on the property name. For example, with a property named lastName, takeValuesFromDictionary looks for a method of the form setLastName: (note that the first letter of the property name is made uppercase), and valuesForKeys looks for a method of the form lastName.

2. If the key-value coding method doesn't find an accessor method, it looks for an instance variable whose name is the same as the property's and sets or retrieves its value directly), by setting an instance variable, takeValuesFromDictionary retains the new value and releases the old one.

Type-checking and Type Conversion

The default implementations of the key-value coding methods accept any id type as a value, and do no type-checking or type conversion among object classes. If it's possible, to pass an NSString to takeValuesFromDictionary: as the value for a property the receiver expects to be an NSDate. The sender of a key-value coding message is thus responsible for ensuring that the values are of the proper class. An EOController, for example, converts string values from the user interface with its data source's coerceValueForKey: method. If you're using a data source to manage your enterprise objects, you can use this method as well. Note that if you're using the Framework's access layer you can determine from an EOModel which value class is associated with each attribute—EODatabaseDataSource uses this information in its implementation of coerceValueForKey:.

The key-value coding methods handle one special case with regard to value types. Numeric values must be transferred in dictionaries as NSNumber objects, but aren't very efficient for calculation or storage; most objects store numeric properties at C scalar (numeric) types and declare their access methods to handle them in that form. In addition to being represented as NSNumbers in dictionaries, numeric property values are handled by an EOController as NSString objects. Because numeric properties are very common, the default implementations of the key-value coding methods convert an object value to the C scalar (numeric) type required by the enterprise object's accessor method or instance variable. For example, suppose your enterprise object defines these accessor methods:

- (void)setSalary:(unsigned int)salary
- (unsigned int)salary

For the setSalary: method, takeValuesFromDictionary: converts the object value for the "salary" key in the dictionary to an unsigned int and passes it as salary. Similarly, valuesForKeys: converts the return value of the salary method to an NSNumber and inserts that into the dictionary that it returns.

The default implementations support the following scalar types:

| | |
|---|---|
| char | unsigned char |
| short | unsigned short |
| int | unsigned int |
| long | unsigned long |
| float | |
| double | |

Object values are converted to these types with the standard messages charValue, intValue, floatValue, and so on. Note that the key-value coding methods don't check that an object value actually responds to these messages; this can result in a run-time error if the object doesn't respond to the appropriate message.

An important issue to consider is using C scalar types is that most relational databases allow the use of a NULL value distinct from any numeric value, represented in the Enterprise Objects Framework by the EONull class. Since the C scalar types can't accommodate a distinct NULL value, the default implementations of the key-value coding methods raise NSInvalidArgumentException on encountering an EONull object that needs to be converted. You should either design your database not to use NULL values for numeric columns, or design your enterprise object class to use NSNumber objects where NULL values are allowed.

Implementing Key-Value Coding Methods

Your own enterprise object class can either rely on the default behavior of its superclass or override it, partially or completely. For example, a subclass of NSObject may have a few properties that it needs to handle in a special way, but the rest can all be handled by the default implementation. In this case, you might implement the methods of this category according to the following templates:

```
- (BOOL)takeValuesFromDictionary:(NSDictionary *)aDictionary
{
    NSMutableDictionary *mutDict;

/* Make a mutable version of the passed-in dict. */
    mutDict = [[aDictionary mutableCopy] autorelease];

/* Take whatever values you need from mutDict, removing them
       from mutDict as you do so.
    */ return [super takeValuesFromDictionary:mutDict];
}
``` takeValuesFromDictionary: here creates its own mutable copy of the dictionary passed in. It handles the keys it needs to, removing them from the dictionary so that the superclass' implementation won't set them as well, and then passes the remaining key-value pair to super. To completely override the superclass' implementation this method would have to handle every key-value pair in the dictionary, returning YES if all key-value pairs were handled, and NO if any of them couldn't be processed.

```
- (NSDictionary *)valuesForKeys:(NSArray *)keys
  NSMutableArray *mutKeys = [[keys mutableCopy] autorelease];
  NSMutableDictionary *mutDict = [NSMutableDictionary dictionary];
  int i;

for (i = [mutKeys count] - 1; i >= 0; i--) {
    /* See if you can put the value for the key at i into mutDict.
     * If your object stores the value as a mutable object you
     *   should create an immutable copy and autorelease it before
     *   putting it into mutDict. mutDict will retain what you give
     *   it as needed.
     */
    if (/* you put the value for the key at i in the dict */) {
      [mutKeys removeObjectAtIndex:i];
    }
  }

[mutDict addEntriesFromDictionary:[super valuesForKeys:mutKeys]];
  return mutDict;
}
``` valuesForKeys creates a mutable copy of the key array passed in, and a mutable dictionary in which to place the values requested. It handles the keys it needs to and removes them from the array, then passes the remaining keys to super and adds the returned values to the dictionary it's building. To completely override the superclass' implementation this method can simply omit the message to super after putting all the values it can find for the keys into the dictionary.

Cautions

Three situations demand care with regard to the key-value coding mechanism. First, be aware that the default implementation of takeValuesFromDictionary: doesn't guarantee the order that property values are set. Thus, your enterprise object's accessor methods shouldn't assume that other properties' values have been established when they're invoked.

Second, if your application is using the access layer, you should be careful in implementing accessor methods that set values (or in overriding takeValuesFromDictionary:) about sending messages to the value objects in the dictionary. takeValuesFromDictionary: is often used while a fetch is in progress, and if your implementation sends a message to an EOFault object, it will try to fetch the object it stands in for, causing a server error. See the EODatabaseChannelNotification informal protocol specification for suggestions on how to work around this problem.

Third, it's possible for a property's value in a database to be NULL, in which case your enterprise object receives an EONull object as the value. If you allow NULL values in your database, your enterprise objects have to check whether the values they receive are EONulls and treat them appropriately.

Method Types

Setting and getting values
    –takeValuesFromDictionary:
    –valuesForKeys:

Resetting key bindings
    –flushKeyBindings

Instance Methods flushKeyBindings
    – (void)flushKeyBindings

Invalidates the cached key-binding information for the receiver's class. The Enterprise Objects Framework uses this information to optimize the default implementations of the other methods of this protocol by caching method selector and instance variable type information.

This method should be invoked whenever a class is modified or removed from the runtime system.

takeValuesFromDictionary:
    – (BOOL)takeValuesFromDictionary:(NSDictionary *)aDictionary Sets properties of the receiver with values from aDictionary. Returns YES if the receiver read all values from the dictionary, NO if it couldn't take all values.

Note: The access and interface layers of the Enterprise Objects Framework don't consider a return value of NO to be an error, and take no special action based on such a return value.

valuesForKeys:
    – (NSDictionary *)valuesForKeys:(NSArray *)keyArray

Returns a dictionary providing as many values as possible for the keys in keyArray. Not all values requested are guaranteed to be retrieved.

Enterprise Objects Framework Release 1.0 Copyright © 1994 by NeXT Computer, Inc. All Rights Reserved.

EOFault

Inherits From: none (EOFault is a root class)

Declared In: eoaccess/EOFault.h

Class Description

An EOFault is an enterprise object (or an array of enterprise objects) whose data hasn't yet been fetched from the database. When an EODatabaseChannel fetches an object that has relationships, it creates EOFaults for the destinations of those relationships (unless, for to-one relationships, the corresponding objects have already been fetched and unique'd). By not fetching an object until the application actually needs it, the EODatabaseChannel prevents unnecessary interaction with the database server.

An EOFault can represent one object, in which case it's called a *single-object fault*, or it can represent an array of objects described by some qualifier, in which case an *array fault*. To-one relationship result in single-object faults, while to-many relationships result in array faults. A single-object fault fetches and loads the real object over itself the first time you send a message to it (with some exceptions, listed below). An array fault loads its objects as soon as you send it any message that requires accessing the contents of the array (objectAtIndex:, count, and so on). EOFaults of either type are called *fault objects*.

The object faultWithPrimaryKey:entity:databaseChannel:zone: class method creates a single-object fault, and the arrayFaultWithQualifier:fetchOrder:databaseChannel:zone: class method creates an array fault. You can't create a fault object with adds and hole... messages.

Your application can explicitly create fault objects to avoid fetch conflicts. This is a concern for newly created enterprise objects that need to fetch objects—other than those given by their relationships—as their takeValuesFromDictionary: or awakeForDatabaseChannel: method (described in the EOKeyValueCoding and EODatabaseChannelNotification protocol specifications, respectively). Because the channel that fetched the enterprise object is busy, the enterprise object can't use it to fetch other objects—and must be careful not to access any objects that are busy fault objects. An enterprise object can use a different channel to fetch another object immediately, or it can create a fault object so that the instance variable at least contains a valid pointer.

A newly created enterprise object must not access a fault object while its channel is busy fetching. Doing so causes the fault to attempt a fetch with that channel, resulting in a fetch conflict. The enterprise object also can't replace a single-object fault with an object it fetches itself; the fault has already been unique'd by the time the enterprise object gets it, and other enterprise objects may hold references to it. An array fault, however, can be replaced; you might want to replace an array fault to change the qualifier or the fetch order that will be used to fetch its targets.

Messages that Don't Cause Fetching

A fault object responds to some messages as if it were the target object, without causing a fetch. For example, class returns the class of object that will be fetched, not the EOFault class. The following instance methods neither cause a fault object to fetch nor betray the true identity of a fault object:

asSubclass
    class
    conformsToProtocol:

Method Types

Creating a fault
— arrayFaultWithQualifier:fetchOrder:
  databaseChannel:zone:
— objectFaultWithPrimaryKey:entity:
  databaseChannel:zone:

Getting information about a fault

Instance Variables

Class isa isa        A pointer to the instance's class structure.

Forcing a Fault Object to Fetch

You can force a fault object to fetch by sending it a message that it can't handle as a fault. The messages listed in the previous section all work with generic run-time information, and so don't cause fetching, but any message that accesses data (such as the key-value coding method valuesForKeys: or a custom message such as lastName) causes the fault to fetch its data with its database channel. EOFault also defines the self message so that it always causes the fault to fetch; this provides you with a method that has no effect on a normal object, but that you can always use to cause a fault object to fetch. Remember that you shouldn't cause a fault to fetch itself if its database channel is busy.

With a single-object fault, you can conveniently use EODatabaseChannel's refetchObject: method to get the data for the fault. This technique allows you to fetch the fault's data even when its database channel is busy, by using a different database channel. refetchObject: checks whether it's fetching for a fault object, and transforms the fault into an instance of its enterprise object class.

Forcing a fetch on an array fault is best done by replacing the array fault with one that has a different database channel, and then causing the new fault to fetch itself:

id array;
    EODatabaseChannel *availableChannel;
    id forcedFault;

forcedFault = [EOFault arrayFaultWithQualifier:[array qualifier]
        fetchOrder:[array fetchOrder]
        databaseChannel:[availableChannel channel]
        zone:[array zone]];

[array autorelease];
    array = [[forcedFault self] retain];

This code excerpt creates a new array fault with the same information as the one being fetched, except that it's using a database channel that isn't busy fetching. It then sends self to the new fault to force it to fetch, and assigns it to the original variable.

description

- (NSString *)description

- isKindOfClass:
- isMemberOfClass:
- isProxy (returns NO)
- printForDebugger:
- release
- respondsToSelector:
- retain
- retainCount
- zone Special instance methods
+ clearFault:
+ databaseChannelForFault:
+ entityForFault:
+ fetchOrderForFault:
+ isFault:
+ primaryKeyForFault:
+ qualifierForFault:
+ targetClassForFault:
- description
- self

Class Methods arrayFaultWithQualifier:fetchOrder:databaseChannel:zone:
+ (NSArray *)arrayFaultWithQualifier:(EOQualifier *)aQualifier fetchOrder:(NSArray *)aFetchOrder databaseChannel:(EODatabaseChannel *)aChannel zone:(NSZone *)zone Returns an array fault that will have aChannel fetch its objects according to aQualifier and aFetchOrder (an array of EOAttributeOrdering objects) when it is accessed for the first time. If aChannel is fetching when the array is accessed, a fetch conflict will result, with undefined results.

See also: + objectFaultWithPrimaryKey:entity:databaseChannel:zone:

clearFault:
+ (void)clearFault:aFault

Turns aFault into a freshly initialized instance of the target class. Does not fetch data for the new instance. Raises NSInvalidArgumentException if invoked with an object that isn't a fault object. You should rarely need to use this method.

See also: + targetClassForFault:

databaseChannelForFault:
+ (EODatabaseChannel *)databaseChannelForFault:aFault Returns the EODatabaseChannel that aFault was created with, or nil if aFault isn't a fault object.

entityForFault:
+ (EOEntity *)entityForFault:aFault

Returns the entity that aFault was created with (or as determined by the qualifier for an array fault). Returns nil if aFault isn't a fault object.

fetchOrderForFault:
+ (NSArray *)fetchOrderForFault:aFault

Returns the array of EOAttributeOrdering objects that aFault was created with, or nil if aFault isn't an array fault.

isFault:
+ (BOOL)isFault:anObject

Returns YES if anObject is a fault object, NO otherwise. You should use this method, not isKindOfClass:, if you need to know whether an object is in fact a fault object.

objectFaultWithPrimaryKey:entity:databaseChannel:zone:
+ objectFaultWithPrimaryKey:(NSDictionary *)aKey entity:(EOEntity *)anEntity databaseChannel:(EODatabaseChannel *)aChannel zone:(NSZone *)zone Returns a single-object fault for an enterprise object with the specified primary key and entity. When accessed, aChannel fetches the actual object for the fault, allocating it from zone. If aChannel is fetching when the fault attempts to fetch, a fetch conflict will result, with undefined results.

See also: + arrayFaultWithQualifier:fetchOrder:databaseChannel:zone:

primaryKeyForFault:
+ (NSDictionary *)primaryKeyForFault:aFault

Returns the primary key for a single-object fault, nil for an array fault or non-fault object.

qualifierForFault:
+ (EOQualifier *)qualifierForFault:aFault

Returns the qualifier used to fetch the object or objects that aFault was created for. For a single-object fault this is the qualifier of the entity the fault was created with, plus the primary key specification; for an array fault this is simply the qualifier the fault was created with. Returns nil if fault isn't a fault object.

See also: - qualifier:(EOQualifier)

targetClassForFault:
+ (Class)targetClassForFault:aFault

Returns the class that will be instantiated when aFault is fetched. For a single-object fault the class is determined by the entity the fault was created with; for an array fault the class is NSMutableArray. Returns nil if aFault isn't a fault object.

See also: - entity:(EOEntity)

Instance Methods description
- (NSString *)description

Returns a string object that represents the contents of the fault object, without causing it to fetch its data. A single-object fault's description contains the name of its entity and the value of its primary key; an array fault's description contains the qualifier used to fetch its object.

self
— self

Causes the fault object to fetch its data and return self. You can use this message to force a fault object to fetch its data immediately.

Appendix B

EOController

Inherits From: NSObject

Declared in: eointerface/EOController.h

Class Description

An EOController synchronizes a set of data-bearing enterprise objects with user interface objects; the interface objects display values for properties of the enterprise objects, and the controller processes changes to those values from the interface objects. The objects an EOController manages are received from a *data source* object. A data source is any object that conforms to the EODataSource protocol, which defines methods for fetching objects from storage, inserting objects into and deleting them from storage, and for changing the properties of existing objects. A data source can also conform to the EOMasterDataSource and EOQualifiableDataSource protocols, allowing it to participate in master-detail relationships, and the EORollbackDataSource protocol, allowing it to roll back changes.

The Enterprise Objects Framework provides two data source classes: EODatabaseDataSource and EODetailDatabaseDataSource. These classes provide objects for a single entity in the application's model, and also conform to the EOMasterDataSource, EOQualifiableDataSource, and EORollbackDataSources protocols.

EOController presents its enterprise objects as an NSArray, and identifies them solely by index in that array. An EOController also maintains a selection in the form of a set of indexes. You can insert, delete, or update an object at a particular index or can apply an operation to all selected objects.

Associations

An EOController communicates with user interface objects through EOAssociation objects. An association links a single, named property of the controller's enterprise objects to a user interface object, such as a TextField or NXTableView. The association is responsible for monitoring the user interface object, notifying the controller when the selection changes or when the user interface object is edited, and updating the user interface object to reflect the values of the controller's enterprise objects.

You can create most associations in Interface Builder, but if you need to set one up programmatically you can usually follow this template:

```
EOController *myController;  /* Assume this exists. */
id myEOObject;               /* Assume this exists. */
Class associationClass;
EOAssociation *myAssociation;

associationClass = [myEOObject associationClass];
myAssociation = [[associationClass alloc] initWithController:myController
                    key:@"propertyName"
                    destination:myEOObject];

[myController addAssociation:myAssociation];
```

This code excerpt assumes no knowledge about association subclasses; it sends associationClass to the user interface object to get a default class for the association, then creates the association to monitor the property named "propertyName". (You may want to confirm that the user interface object responds to associationClass before sending it.) Finally, it adds the association to the set managed by the controller with addAssociation:.

Note: This approach doesn't work for an NXTableView; its association class, EOColumnAssociation, requires special handling. See the EOColumnAssociation class specification for more information.

If you have a special association class designed to work with a user interface object, you can explicitly create an instance of that class instead of asking the user interface for its default association class. associationClass is simply a mechanism for dynamically selecting an appropriate association for a given user interface object.

An association forms an intimate link with its user interface object. It nearly always sets itself up as a control's target, and often sets itself up as the text delegate of its user interface object as well. You should assume that a user interface object managed by an association is off-limits with regard to changing its state, and handle all data manipulation and validation in the controller's delegate or in the enterprise objects themselves (note that a custom association can also handle validation).

A slightly different type of association is that between two EOControllers. An EOQualifiedAssociation links two controllers in a master-detail relationship, so that when the object selected in the master controller changes, the detail controller's data source is configured to provide objects related to the one selected in the master.

Master-detail Controllers and the Controller Chain

Controllers linked in a master-detail relationship are treated specially. When an EOController performs a fetch, saveToObjects, saveToDataSource, or redisplay message, it checks the destination of each of its associations to see if that object is an EOController. If so, it propagates the operation to them, thus synchronizing the state and display of all linked controllers.

If you don't want to set up a pair of controllers in a master-detail relationship, you can still have one of them propagate the methods listed above by using the setNextController: message or connecting the two controllers in Interface Builder. Linking controllers together in this manner allows the otherwise independent controllers, each managing their own sets of enterprise objects, to remain synchronized with respect to all significant operations. You can link any number of controllers together in this fashion, but you should be aware that the four actions are propagated down the chain only; controllers above the one that receives the original message aren't notified (unless the chain is in a loop, which is permitted).

Buffering and Undo

EOController offers two levels of change buffering and a powerful undo mechanism. There are two kinds of changes: edits to the values of enterprise objects, and operations on the enterprise objects in the data source (insertion, deletion, and update with buffered edits). When a controller is buffering edits, it saves each change sent by its association objects. It doesn't apply these changes to its enterprise objects until it receives a saveToObjects message. Similarly, operations on the objects held by the controller aren't applied to the data source until the controller receives a saveToDataSource message.

You can remove buffering so that changes are immediately saved by sending a controller a setSaveToObjectsAutomatically: or setSaveToDataSourceAutomatically: message. This table shows how automatic saving affects the state of the controller's enterprise objects and data source:

| Saves automatically to: | | |
|---|---|---|
| Objects | Data Source | Behavior |
| YES | YES | All changes are immediately sent to the controller's data source. This is the default behavior for controllers created in Interface Builder. |
| YES | NO | Edits immediately go to enterprise objects; you must send saveToDataSource to send changes to the data source. |
| NO | YES | Edits are buffered, but when you send saveToObjects changes are immediately sent to the data source. |
| NO | NO | You must send saveToObjects to effect changes to enterprise objects, then send saveToDataSource to send the changes to the data source. This is the default behavior for controllers created programmatically. |

In addition to buffering changes, an EOController maintains an undo stack that records those changes after they've been applied. You can send a controller a markUndo message at any time to mark the current point on the undo stack. A later undo message reverts the changes in the undo stack back to that point: deleted objects are recovered, inserted objects are deleted, and all edits—pending and saved—are undone. You can configure an EOController to automatically mark an undo point after every operation, or you can manually control undo marks to group operations together so that they can all be undone with a single undo message.

For more information on data sources, see the EODataSources and EOQualifiableDataSources protocol specifications.

Notifying the Controller's Delegate

An EOController notifies its delegate of nearly every operation it performs. It confirms any insertion, deletion, or update with its delegate before performing the operation, and notifies the delegate of undo and save operations, and of any change in its selection. Further, if a change to the data source fails for any reason, the delegate has a chance to tell the controller whether to simply continue or to roll back changes (if the data source supports rollback).

All a delegate need do to receive a notification from its controller is implement the appropriate methods. These methods are documented after the EOController's class and instance methods, under "Methods Implemented by the Delegate". If the delegate doesn't implement a particular method, it isn't invoked.

Instance Variables

None declared in this class.

Method Types

| | |
|---|---|
| Initializing an EOController | – initWithDataSource: |
| Managing associations | – addAssociation: |
| | – associations |
| | – keys |
| | – removeAssociation: |
| Getting the objects | – allObjects |
| Fetching objects | – fetch |
| Managing the selection | – setSelectionIndexes: |
| | – selectionIndexes |
| | – selectedObjects |
| | – clearSelection |
| | – selectNext |
| | – selectPrevious |
| | – selectsFirstObjectAfterFetch |
| | – setSelectsFirstObjectAfterFetch: |
| Editing objects | – associationDidEdit: |
| | – setValuesForObject: |
| | – endEditing |
| Performing operations on objects | – deleteObjectAtIndex: |
| | – deleteSelection |
| | – insertObjectAtIndex: |
| | – insertObject:atIndex: |
| | – discardEdits |
| Discarding changes | – discardOperations |
| | – isDiscardAllowed |
| Saving edits to objects | – saveToObjects |
| | – hasChangesForObjects |
| | – setSavesToObjectsAutomatically |
| | – savesToObjectsAutomatically |
| Saving to the data source | – saveToDataSource |
| | – hasChangesForDataSource |
| | – setSavesToDataSourceAutomatically |
| | – savesToDataSourceAutomatically |
| Controlling undo | – setUndoEnabled: |
| | – isUndoEnabled |
| | – markUndo |
| | – undo |
| | – redoUndo |
| | – setMarksEveryOperation: |
| | – marksEveryOperation |
| | – setMaximumUndoMarks: |
| | – maximumUndoMarks |
| Redisplaying the user interface | – redisplay |
| Chaining controllers | – setNextController: |
| | – nextController |
| Setting the data source | – setDataSource: |
| | – dataSource |
| Setting the delegate | – setDelegate: |
| | – delegate |
| Action methods | – delete: |
| | – discardOperations: |
| | – fetch: |
| | – insert: |
| | – markUndo: |
| | – saveToDataSource: |
| | – saveToObjects: |
| | – selectNext: |
| | – selectPrevious: |
| | – undo: |

Instance Methods addAssociation:
– (void)addAssociation:(EOAssociation *)anAssociation

Adds *anAssociation* to the set managed by the controller.

See also: – removeAssociation:, – associations allObjects
– (NSArray *)allObjects

Returns all enterprise objects accessible through the controller.

See also: – selectedObjects association:DidEdit:
– (void)association:(EOAssociation *)anAssociation
  didEdit:(EOAssociation *)anAssociation Informs the controller that *anAssociation* has a pending edit. The controller gets *anAssociation*'s key and value and adds the new value to its edit buffer.

If the controller is configured to save changes automatically then the changes are immediately saved to the objects. If the controller doesn't save changes automatically, the changes don't take effect until the controller receives a saveToObjects message.

This method invokes the delegate method controller:association:didEdit:(EOAssociation)anAssociation
– saveToObjectsAutomatically See also: – key (EOAssociation), – value (EOAssociation), – saveToObjectsAutomatically associations
– (NSArray *)associations

Returns the controller's associations.

clearSelection
– (BOOL)clearSelection

Empties the controller's selection. This method is a shortcut for sending setSelection: with an empty array. Doesn't redisplay the user interface objects. Returns YES if successful, NO if not.

See also: – redisplay dataSource
– (id <EODataSources>)dataSource

Returns the controller's data source.

delegate
– delegate

Returns the controller's delegate.

delete:
– delete:sender

This action method invokes deleteSelection to delete all selected objects. Returns self if deleteSelection returns YES, nil if it returns NO.

deleteObjectAtIndex:
– (BOOL)deleteObjectAtIndex:(unsigned int)index

Deletes the object at *anIndex*, pending approval by the delegate. Returns YES if the object is actually deleted, NO otherwise.

If the data source can't delete, this method opens an attention panel notifying the user and returns NO. If the data source can delete, invokes endEditing and notifies the delegate with controller:willDeleteObject:. If the delegate approves, deletes the object and notifies the delegate with controller:didDeleteObject: and the controller's associations with controllerDidChange and selectionDidChange.

Deletion is an operation applied immediately to the object; you don't need to send saveToObjects. If the controller is configured to save to the data source automatically then the changes are immediately made to the data source as well. If the controller doesn't save changes automatically, the changes don't take effect in the data source until the controller receives a saveToDataSource message.

See also: – delete:, – deleteSelection, – saveToDataSourceAutomatically deleteSelection
– (BOOL)deleteSelection

Deletes all objects in the selection in the manner described for deleteObjectsAtIndex: (including invocation of delegate methods). Returns YES if all objects in the selection were successfully deleted (or if there were no objects selected), NO otherwise. If this method returns NO it's possible that only some objects in the selection have been deleted.

Deleting the selection is considered a single operation for purposes of undo, even if the controller marks every operation.

See also: – delete:, – deleteSelection, – saveToDataSourceAutomatically discardEdits
– (void)discardEdits

Clears all edits pending in the controller, and also in user interface objects (by sending discardEdits to all of the controller's associations). This method is only useful if the controller isn't configured to save to objects automatically.

See also: – saveToObjectsAutomatically discardEdits:
– discardEdits:sender

This action method invokes discardEdits and returns self.

discardOperations

- (void)discardOperations

Clears all pending operations. This method is only useful if the controller isn't configured to save to the data source automatically.

See also: – savesToDataSourceAutomatically

This action method invokes discardOperations and returns self.

discardOperations:
- discardOperationsender

This action method invokes discardOperations and returns self.

endEditing
- (void)endEditing

Sends endEditing to each of the controller's associations. This method is invoked whenever the controller needs to force an end to editing in the user interface objects, which is whenever:

- The controller fetches.
- The controller saves changes to its objects or to its data source.
- An object is inserted or deleted.
- The selection changes.
- The undo stack is altered by a nextUndo, redo, or releaseUndo message.

See also: – endEditing (EOAssociationNotification protocol)

fetch
- (BOOL)fetch

Fetches objects from the controller's data source, returning YES if successful, NO if not.

Before fetching, invokes endEditing and confirms that pending changes can be discarded by invoking isDiscardAllowed. Also confirms that any detail controllers can discard pending changes. Aborts the fetch and returns NO if isDiscardAllowed returns NO or if any of the detail or linked controllers don't allow discard.

After confirming that changes can be discarded, proceeds to discard all edits and operations and clears the undo stack. At this point, the controller sends controllerWillFetch to its delegate, aborting the fetch and returning NO if the delegate returns NO. If the delegate returns YES, the controller sends fetchObjects to its data source and resynchronizes its selection with the new objects.

After fetching objects, the controller sends controllerDidFetchObjects to its delegate and controllerDidChange to its associations. If the controller's selection changed as a result of fetching, also sends selectionDidChange to the associations. Finally, the controller propagates the fetch message to all detail and linked controllers.

See also: – discardEdits, – releaseUndo, – selectFirstObjectAfterFetch fetch:
- fetch:sender

This action method invokes fetch and returns self if fetch returns YES, nil if it returns NO.

hasChangesForDataSource

- (BOOL)hasChangesForDataSource

Returns YES if there are any operations buffered for the data source, NO otherwise.

See also: – savesToDataSourceAutomatically, – hasChangesForObjects, – savesToObjects hasChangesForObjects
- (BOOL)hasChangesForObjects

Returns YES if any object has been edited since the last saveToObjects message, NO otherwise.

See also: – savesToObjectsAutomatically, – hasChangesForDataSource, – associationDidEdit:, – setValuesForObject:

initWithDataSource:
- initWithDataSource:(id <EODataSources>)aDataSource

Initializes a newly allocated EOController to get its data from objects provided by aDataSource. This is the designated initializer for the EOController class. Returns self.

insert
- insertsender

This action method uses insertObjectAtIndex: to insert a new object after the selected object, or if nothing is selected, at the end of the array. Returns self, or nil if insertObjectAtIndex: returns nil.

insertObjectAtIndex:
- insertObjectAtIndex:(unsigned int)anIndex

Inserts and selects a new object, created by the controller's data source, at anIndex by invoking insertObject:atIndex:. Invokes endEditing before performing the insertion. Returns the object that was inserted, or nil on failure.

Note: You must set the new object's primary key before saving to the data source. If the controller is configured to save automatically to the data source you shouldn't use this method.

Raises NSRangeException if anIndex indicates a position past the end of the controller's array of objects.

See also: – createObject (EODataSource protocol of the access layer)

insertObject:atIndex:
- insertObject:(id)anEO atIndex:(unsigned int)anIndex

Inserts anEO at anIndex in the array of enterprise objects managed by the controller. Invokes endEditing before performing the insertion. Returns the object that was inserted, or nil on failure. Raises NSRangeException if anIndex indicates a position past the end of the controller's array of objects.

Insertion is an operation applied immediately to the object; you don't need to send a saveToObjects. If the controller is configured to save to the data source automatically then the changes are immediately made to the data source as well. If the controller doesn't save changes automatically, the changes don't take effect in the data source until the controller receives a saveToDataSource message.

Note: You must set *anEO*'s primary key before saving to the data source. If the controller is configured to save to the data source *anEO* must already have its primary key set when you insert it.

After inserting the object the controller selects it and sends contentsDidChange and selectionDidInsertObject.

This method invokes the delegate methods controllerWillInsertObject, controllerDidChange and selectionDidInsertObject, and controllerDidSetPrimaryKeyForObject. See the descriptions for these methods for information on how they affect insertion.

See also: – Inserti:, – moveToDataSourceAutomatically isDiscardAllowed
  – (BOOL)isDiscardAllowed

Verifies that discarding of edits not saved to objects and updates not saved to the data source is allowed. Returns YES if discarding of edits and updates is allowed, NO if not. A controller uses this method when fetching and changing the selection, to make sure that an operation doesn't inadvertently discard pending changes.

If the controller has any pending edits, it sends controllerWillDiscardEdits to the delegate. If the delegate returns NO, this method continues by checking whether operations may be discarded. If the delegate doesn't implement controllerWillDiscardEdits, the controller opens an attention panel asking the user if it's okay to discard edits. The panel offers the user the choice to save the edits (causing saveToObjects to be invoked), to cancel whatever operation invoked this method, or to allow edits to be discarded; if the user chooses to save edits or to cancel, this method returns NO.

Next, if there are any operations not saved to the data source the controller sends controllerWillDiscardOperations: to the delegate. Again, if the delegate doesn't implement this method the controller opens an attention panel asking the user to save, cancel, or allow discard of operations; if the user chooses to save operations or to cancel, this method returns NO. Finally, if all of these conditions are passed, this method returns YES.

See also: – discardEdits, – saveToObjects, – saveToDataSource isUndoEnabled
  – (BOOL)isUndoEnabled

Returns YES if undo is enabled, NO otherwise. Undo is by default not enabled for controllers created programmatically, though it is for controllers created in Interface Builder.

keys
  – (NSArray *)keys

Returns the keys used by the controller's associations (which aren't necessarily all the keys used by its enterprise objects). These keys are the names of properties of the controller's enterprise objects, as used in the EOKeyValueCoding informal protocol defined by the access layer. These may be duplicate keys in the returned array.

See also: – key (EOAssociation)

markUndo
  – (void)markUndo

Ends editing and marks the current state of the undo stack as an undo point. An undo message reverts changes made since the last undo point marked. This method does nothing if undo isn't enabled or if a mark is already set on the top of undo stack.

See also: – isUndoEnabled, – releaseUndos, – endEditing markUndoSender:
  – markUndoSender:

This action method invokes markUndo and returns self.

markEveryOperation
  – (BOOL)markEveryOperation

Returns YES if an undo point is marked upon every insertion, deletion, and application of edits to an enterprise object, NO otherwise. Controllers created programmatically by default don't mark every operation, while those created in Interface Builder do.

See also: – deleteSelection maximumUndoMarks
  – (unsigned int)maximumUndoMarks

Returns the maximum number of undo marks the controller will record. Marks added beyond this limit cause earlier marks to fall off the queue. This method is useful for restricting memory usage. The default maximum is zero, which actually indicates no limit.

See also: – isUndoEnabled nextController
  – (EOController *)nextController

Returns the next controller in the controller chain. See the class description for information on the controller chain.

redisplay
  – (void)redisplay

Sends contentsDidChange to all of the controller's associations, causing them to redisplay their user interface items as needed. Also has the controller's detail controllers and next controller redisplay.

See also: – nextController releaseUndos
  – (void)releaseUndos

Clears all undo information. No undo is possible until a new undo point is established, either automatically or with markUndo.

See also: – markEveryOperation undo:
  – undo:

See also: – isUndoEnabled, – releaseUndos, – endEditing removeAssociation:

− (void)removeAssociation:(EOAssociation *)anAssociation

Removes an Association from the set managed by the controller.

See also: − addAssociation:

saveToDataSourceAutomatically

− (BOOL)savesToDataSourceAutomatically

Returns YES if saving to objects, or inserting or deleting an object, results in the controller performing saveToDataSource. NO if it doesn't. Controllers created programmatically by default save automatically, but those created in Interface Builder do.

See also: − saveToObjects, − saveToObjectsAutomatically savesToObjectsAutomatically

− (BOOL)savesToObjectsAutomatically

Returns YES if the controller immediately performs saveToObjects when an association notifies it of an edit or when an object is edited with setValueForObject:. Returns NO otherwise. Controllers created programmatically by default don't save automatically, but those created in Interface Builder do.

See also: − association:DidEdit:, − saveToDataSourceAutomatically saveToDataSource

− (BOOL)saveToDataSource

Ends editing and saves all pending operations for the controller itself, for its detail controllers, and for its next controller. If none of the controller has saved edits to their objects, this method has no effect; use saveToObjects to make sure pending edits are applied to the object before invoking saveToDataSource. Returns YES if all changes are successfully saved to the data source, NO if any save operation fails or is refused by the delegate. If this method returns NO and the controller's data source doesn't support rolling back operations, some changes may have been saved anyway.

In saving an object, the controller sends it a prepareForDataSource message (if it responds). If the object returns NO the controller sends its delegate a controller:objectsFailedToPrepareForDataSource: message. If the delegate returns EOControllerDataSourceFailureResponse the controller continues saving the remaining objects. If the delegate returns EORollbackDataSourceFailureResponse or doesn't implement the delegate method, the controller rolls back all operations—if the data source supports rollback—and returns NO.

If the object returns YES from prepareForDataSource, then the controller checks with its delegate for each operation to save and sends insertObjects:, deleteObjects:, or updateObjects: to the data source depending on the change to be saved. If any of these messages fails, this method informs the delegate, stops saving, and returns NO.

This method may invoke any of the delegate methods listed below, depending on the individual save operations being performed. See the descriptions of the individual methods for more information on how they interact with saveToDataSource.

controller:objectsFailedToPrepareForDataSource:
controller:WillSaveToDataSource:
controller:DidSaveToDataSource:
controller:willRollbackDataSource:
controller:didRollbackDataSource:

controller:willInsertObjectsInDataSource:
controller:didInsertObjectsInDataSource:
controller:failedToInsertObjectsInDataSource:
controller:willDeleteObjectsInDataSource:
controller:didDeleteObjectsInDataSource:
controller:failedToDeleteObjectsInDataSource:
controller:willUpdateObjectsInDataSource:
controller:didUpdateObjectsInDataSource:
controller:failedToUpdateObjectsInDataSource:

See also: − insertObjectAt(index);, − deleteObjectsAt(index);, − endEditing saveToDataSource:

− saveToDataSource:(id)sender

This action method invokes saveToDataSource, returning self if saveToDataSource returns YES, nil if it returns NO.

saveToObjects

− (BOOL)saveToObjects

Ends editing and saves all edits made to objects or operations to apply to the controller's data source. Returns YES if all changes are successfully saved to the controller's objects, NO if any save operation fails or is refused by the delegate. If this method returns NO some changes may have been saved while others may not.

In saving a set of edits to an enterprise object, the controller first confirms the action with its delegate by sending it a controller:willSaveEditsIntoObject: message; if the delegate returns nil the controller aborts the save operation and returns NO. The controller takes a non-nil return value from this message and converts the new values by sending sourceValuesforKey: to its data source. It then applies the converted values to the enterprise object by sending the enterprise object a takeValuesFromDictionary: message (a method of the access layer's EOKeyValueCoding informal protocol). After saving each object the controller sends controller:didSaveToObjects: to its delegate.

If the controller saves to the data source automatically then the each saved edit is immediately applied to the data source. If the controller doesn't save changes automatically, the changes don't affect the data source until the controller receives a saveToDataSource message.

Finally, after saving all edits the controller sends controller:didChange and discardEdits to its associations. If all of the changes were successfully saved, the controller has its detail controllers and next controller save to objects as well.

See also: − association:DidEdit:, − saveToDataSource:, − endEditing saveToObjects:

− saveToObjects:(id)sender

This action method invokes saveToObjects, returning self if saveToObjects returns YES, nil if it returns NO.

selectNext

− (BOOL)selectNext

Select the object after the currently selected object. If no objects are selected or if the last object is selected, then the first object becomes selected. If multiple objects are selected, this method selects the object after the first object in the selection. This method results in a setSelectionIndexes: message being sent, and returns the value returned by that selection.

message.

This method is useful for user interfaces that display only one object at a time.

See also: – selectNext:

selectNext:
– selectNext:sender

This action method invokes selectNext, returning self if selectNext returns YES, nil if it returns NO.

selectPrevious
– (BOOL)selectPrevious

Selects the object before the currently selected object. If no objects are selected then the first object becomes selected. If the first object is selected then the last object becomes selected. If multiple objects are selected, this method selects the object before the first object in the selection. This method results in a setSelectionIndexes: message being sent, and returns the value returned by that message.

This method is useful for user interfaces that display only one object at a time.

See also: – selectPrevious:

selectPrevious:
– selectPrevious:sender

This action method invokes selectPrevious, returning self if selectPrevious returns YES, nil if it returns NO.

selectedObjects
– (NSArray *)selectedObjects

Returns the selected objects.

See also: – selectedObjects, – allObjects selectionIndexes
– (NSArray *)selectionIndexes

Returns an array of NSNumber objects identifying the indexes of the selected objects in the controller's array of objects.

See also: – selectFirstObjectAfterFetch selectsFirstObjectAfterFetch
– (BOOL)selectsFirstObjectAfterFetch

Returns YES if the controller selects the first of its objects after performing a fetch, NO if not.

See also: – setSelectsFirstObjectAfterFetch:

setDataSource:
– (void)setDataSource:(id <EODataSource>)dataSource

Sets the controller's data source to aDataSource, clears the selection and the undo stack, and discards all pending changes. This method invokes the delegate method controller:didChangeDataSource:

See also: – releaseUndo, – discardEdits, – clearSelection setDelegate:
– (void)setDelegate:anObject

Sets the controller's delegate to anObject. Doesn't retain anObject.

setMarksEveryOperation:
– (void)setMarksEveryOperation:(BOOL)flag

Sets according to flag whether the controller marks an undo point for every insertion, deletion, or edit of an object. Controllers created programmatically don't mark every operation by default, while those created in Interface Builder do.

See also: – markUndo, – deleteSelection setMaximumUndoMarks:
– (void)setMaximumUndoMarks:(unsigned int)anInt

Sets to anInt the maximum number of undo marks that will be recorded. Marks added after the maximum amount will cause earlier marks to be discarded. This method is useful for restricting memory usage. Setting the maximum to 0 allows unlimited undo queueing; this is the default. Use setUndoEnabled: to disable undo.

See also: – undo setNextController:
– setNextController:(EOController *)aController

Sets the next controller in the controller chain to aController. See the class description for information on the controller chain.

setSavesToDataSourceAutomatically:
– (BOOL)setSavesToDataSourceAutomatically:(BOOL)flag Sets according to flag whether operations such as insert, delete, and update with edits automatically result in the controller performing saveToDataSource. Returns YES if successful, NO if the controller has any pending operations for its data source.

Controllers created programmatically don't save automatically by default, but those created in Interface Builder do.

See also: – setSavesToObjectsAutomatically:

setSavesToObjectsAutomatically:
- (BOOL)setSavesToObjectsAutomatically:(BOOL)flag Sets according to *flag* whether the controller immediately performs saveToObjects when an object is edited. Returns YES if successful, NO if the controller has any pending edits for its objects.

Controllers created programmatically don't save automatically by default, but those created in Interface Builder do.

See also: – setSavesToDataSourceAutomatically:, – association:didEdit:, – setValuesforObject:

setSelectionIndexes:
- (BOOL)setSelectionIndexes:(NSArray *)aSelection

Sets the selection as an array of NSNumber objects. Returns YES if the selection is changed to *aSelection*, NO if not.

The controller recursively sends isDiscardEditsAllowed to all of its detail controllers, and if any of them returns NO the selection isn't changed. If the detail controllers allow discard that this method invokes endEditing, sets the selection indexes, and notifies its associations with selectionDidChange. Finally, this method sends controllerDidChangeSelection to the delegate.

If an association attempts to change the selection of its controller and fails, the association should reset the selection of its user interface object from the controller's selection. It can do this by simply sending itself a selectionDidChange method.

setSelectsFirstObjectAfterFetch:
- (void)setSelectsFirstObjectAfterFetch:(BOOL)flag Sets according to *flag* whether the controller selects the first of its objects after performing a fetch.

See also: – setSelectionIndexes:

setUndoEnabled:
- (void)setUndoEnabled:(BOOL)flag

Enables or disables undo according to *flag*. Undo is by default not enabled for controllers created programmatically, though it is for controllers created in Interface Builder.

This method doesn't affect existing undo marks. You can temporarily disable undo, then reenable it and perform an undo; however, any changes made while undo was disabled won't be reverted.

setValues:forObject:
- (void)setValues:(NSDictionary *)newValues forObject:(id)anEO Applies *newValues* to *anEO* as if they were edits made by an association. If the controller doesn't save automatically to objects, the new values are buffered as edits that will actually be sent to *anEO* upon the next saveToObjects message. If the controller saves automatically then the changes are immediately saved to the objects.

The controller's associations are not notified when an edit is made with this method. You should send the controller a redisplay message after you finish editing objects programmatically to update the user interface.

See also: – association:didEdit:, – saveToObjectsAutomatically

Methods Implemented by the Delegate controller:association:didEditObject:key:value:
- (void)controller:(EOController *)controller
  association:(EOAssociation *)anAssociation
  didEditObject:(id)anEO
  key:(NSString *)aKey
  value:(id)aValue Sent from association:didEdit: to inform the delegate that *anAssociation* has performed an edit.

controller:didChangeDataSource:
- (void)controller:(EOController *)controller didChangeDataSource:(id <EODataSources>)aDataSource Sent from controllerDidChangeDataSource: to inform the delegate that *controller*'s data source is now *aDataSource*.

controller:didChangeSelection:
- (void)controller:(EOController *)controller didChangeSelection:(EOController *)controller Sent whenever *controller*'s selection changes to inform the delegate of the change.

controller:didDeleteObject:
- (void)controller:(EOController *)controller didDeleteObject:(id)anEO Sent from any of the delete methods to inform the delegate that *controller* has deleted *anEO*.

undo:
- (void)undo:

This action method invokes undo and returns self.

undo
- (void)undo

Reverts all changes in the undo stack to the last undo mark set; inserted objects are removed, deleted objects restored, and any edits are reversed. If there are no undo marks set, does nothing.

This method first invokes saveToObjects to accumulate all changes in the operation buffer, from which they're reverted. If the user is editing a value and the controller marks every operation, this results in the undo operation naturally reverting just the edit in progress.

The controller notifies its delegate before reverting changes with a controllerWillUndo message: if the delegate returns NO the undo operation is aborted. Similarly, for each change reverted the controller sends its delegate a controllerWillUndoObject: message; if the delegate returns NO then the undo for that object is skipped but the undo operation continues. After the change is reverted the controller sends controllerDidUndoObject to its delegate and controllerDidChange to its association. If the controller's selection changes it also sends selectionDidChange to its associations.

See also: – endEditing, – redisplay, – markUndo, – setMarksEveryOperation, – setUndoEnabled:

controller:didDeleteObjectInDataSource:
- (void)controller:(EOController *)ycontroller
  didDeleteObject:(id)anEO
  inDataSource:aDataSource Sent from saveToDataSource to inform the delegate that controller has deleted anEO from aDataSource.

controller:didFetchObjects:
- (void)controller:(EOController *)ycontroller didFetchObjects:(NSArray *)objects Sent from fetch to inform the delegate that controller has fetched the enterprise objects in objects from its data source.

controller:didInsertObject:
- (void)controller:(EOController *)ycontroller didInsertObject:(id)anEO Sent from saveToObjects to inform the delegate that controller has inserted anEO.

controller:didInsertObjectInDataSource:
- (void)controller:(EOController *)ycontroller
  didInsertObject:(id)anEO
  inDataSource:aDataSource Sent from saveToDataSource to inform the delegate that controller has inserted anEO into aDataSource.

controller:didRollbackDataSource:
- (void)controller:(EOController *)ycontroller didRollbackDataSource:(id <EODataSource>)aDataSource Sent from saveToDataSource to inform the delegate that controller has rolled back changes in aDataSource.

controller:didSaveToDataSource:
- (void)controller:(EOController *)ycontroller didSaveToDataSource:(EOController *)ycontroller Sent from saveToDataSource to inform the delegate that controller has finished saving all operations to its data source. This method is only invoked if all operations were successfully saved.

controller:didSaveToObjects:
- (void)controller:(EOController *)ycontroller didSaveToObjects:(id)anEO Sent from saveToObjects to inform the delegate that controller has saved edits to anEO.

controller:didUndo:
- (void)controller:(EOController *)ycontroller didUndo:(id)anEO Sent from undo to inform the delegate that controller has performed an undo operation.

controller:didUndoObject:
- (void)controller:(EOController *)ycontroller didUndoObject:(id)anEO Sent from undo to inform the delegate that controller has undone changes to anEO.

controller:didUpdateObjectInDataSource:
- (void)controller:(EOController *)ycontroller
  didUpdateObject:(id)anEO
  inDataSource:aDataSource Sent from saveToDataSource to inform the delegate that controller has updated anEO in aDataSource.

controller:failedToDeleteObjectInDataSource:
- (EODataSourceFailureResponse)controller:(EOController *)ycontroller
  failedToDeleteObject:(id)anEO
  inDataSource:aDataSource Sent from saveToDataSource to inform the delegate that controller has failed to delete anEO from aDataSource. If the delegate returns EORollbackDataSourceFailureResponse controller continues saving other changes to the data source.

If the delegate returns EOContinueDataSourceFailureResponse controller sends rollback to its data source and returns a failure result.

In rolling back the data source, the controller invokes the delegate methods controller:willRollbackDataSource: and controller:didRollbackDataSource:.

controller:failedToInsertObjectInDataSource:
- (EODataSourceFailureResponse)controller:(EOController *)ycontroller
  failedToInsertObject:(id)anEO
  inDataSource:aDataSource Sent from saveToDataSource to inform the delegate that controller has failed to insert anEO into aDataSource. If the delegate returns EOContinueDataSourceFailureResponse controller continues saving other changes to the data source. If the delegate returns EORollbackDataSourceFailureResponse controller sends rollback to its data source and returns a failure result.

In rolling back the data source, the controller invokes the delegate methods controller:willRollbackDataSource: and controller:didRollbackDataSource:.

controller:failedToUpdateObjectInDataSource:
- (EODataSourceFailureResponse)controller:(EOController *)ycontroller
  failedToUpdateObject:(id)anEO
  inDataSource:aDataSource Sent from saveToDataSource to inform the delegate that controller has failed to update anEO in aDataSource. If the delegate returns EOContinueDataSourceFailureResponse controller continues saving other changes to the data source. If the delegate returns EORollbackDataSourceFailureResponse controller sends rollback to its data source if the data source responded to that message, and returns a failure result.

In rolling back the data source, the controller invokes the delegate methods controller:willRollbackDataSource: and controller:didRollbackDataSource:.

controller:objectFailedToPrepareForDataSource:
- (EODataSourceFailureResponse)controller:(EOController *)controller
  objectFailedToPrepareForDataSource:(id)dataSource Sent from saveToDataSource when anEO returns NO from a prepareForFetchResponse message. If the delegate returns EOConditionalDataSourceFailureResponse controller continues saving other changes to the data source. If the delegate returns EORollbackDataSourceFailureResponse controller sends rollback to its data source. If the data source responds to that message, saveToDataSource then aborts and returns a failure result.

controller:saveObjectsFailedForDataSource:
- (void)controller:(EOController *)controller
  saveObjectsFailedForDataSource:(id)dataSource Sent from saveToDataSource to inform the delegate that dataSource returned NO from a saveObjects message.

controller:willDeleteObject:
- (BOOL)controller:(EOController *)controller willDeleteObject:(id)anEO Sent from any of the delete methods to inform the delegate that controller will delete anEO. If the delegate returns NO the deletion isn't performed and saveToObjects is aborted; if the delegate returns YES the deletion proceeds.

controller:willDeleteObject:inDataSource:
- (BOOL)controller:(EOController *)controller
  willDeleteObject:(id)anEO
  inDataSource:(id)dataSource Sent from saveToDataSource to inform the delegate that controller will delete anEO from a dataSource. If the delegate returns NO the deletion isn't performed (though saveToDataSource continues for other operations); if the delegate returns YES the deletion proceeds.

controller:willDiscardEdits:
- (BOOL)controller:(EOController *)controller

Sent from isDiscardAllowed to inform the delegate that controller is about to discard pending edits. If the delegate doesn't implement this method controller opens an attention panel warning the user that edits may be discarded. If the delegate returns NO then isDiscardAllowed returns NO; if the delegate returns YES then isDiscardAllowed proceeds.

If the delegate wants to make sure edits are preserved it can explicitly send saveToObjects to controller.

controller:willDiscardOperations:
- (BOOL)controller:(EOController *)controller Sent from isDiscardAllowed to inform the delegate that controller is about to discard pending operations destined for its data source. If the delegate doesn't implement this method controller opens an attention panel warning the user that updates may be discarded. If the delegate returns NO then isDiscardAllowed returns NO; if the delegate returns YES then isDiscardAllowed proceeds.

If the delegate wants to make sure updates are preserved it can explicitly send saveToDataSource to controller.

controller:willFetch:
- (BOOL)controller:(EOController *)controller

Invoked from fetch to inform the delegate that controller is about to fetch. If the delegate returns NO the fetch is aborted; if the delegate returns YES the fetch proceeds.

controller:willInsertObject:atIndex:
- (BOOL)controller:(EOController *)controller
  willInsertObject:(id)anEO
  atIndex:(unsigned int)anIndex Sent from insertObject:atIndex: to inform the delegate that controller will insert anEO into it's array of objects at anIndex. If the delegate returns NO the insertion is aborted; if the delegate returns YES the insertion proceeds. The delegate may modify anEO, usually by setting its primary key to a unique value.

controller:willInsertObject:inDataSource:
- (BOOL)controller:(EOController *)controller
  willInsertObject:(id)anEO
  inDataSource:(id)dataSource Sent from saveToDataSource to inform the delegate that controller will insert anEO into aDataSource. If the delegate returns NO the insertion isn't performed (though saveToDataSource continues for other operations); if the delegate returns YES the insertion proceeds. The delegate can't prevent this operation, but may take whatever action it needs based on this information.

controller:willRollbackDataSource:
- (void)controller:(EOController *)controller willRollbackDataSource:(id)dataSource Sent from saveToDataSource to inform the delegate that controller will roll back changes in aDataSource. The delegate can't prevent this operation, but may take whatever action it needs based on this information.

controller:willSaveEdits:toObject:
- (NSDictionary *)controller:(EOController *)controller
  willSaveEdits:(NSDictionary *)newValues
  toObject:(id)anEO Sent from saveToObjects to inform the delegate that controller will save edits to anEO. newValues is a dictionary of key-value pairs whose keys are the names of properties belonging to anEO and whose values are the new values anEO will be given for those properties. The delegate can return the values as they are, or can return a substitute set of values to apply to the object. If the delegate returns nil the save isn't performed and saveToObjects is aborted.

controller:willSaveToDataSource:

- (BOOL)controller:(EOController *)controller willSaveToDataSource:(EOController *)controller Sent from saveToDataSource to inform the delegate that controller will save changes to its data source. If the delegate returns NO the save is aborted; if the delegate returns YES the save proceeds.

controller:willUndo:

- (BOOL)controller:willUndo:(EOController *)controller

Sent from undo to inform the delegate that controller will undo changes. If the delegate returns NO the undo operation is aborted; if the delegate returns YES the undo operation proceeds.

controller:willUndoObject:

- (BOOL)controller:(EOController *)controller willUndoObject:anEO

Sent from undo to inform the delegate that controller will undo changes previously made to anEO. If the delegate returns NO the undo operation for anEO only is aborted (the larger undo operation proceeds); if the delegate returns YES the undo operation for anEO proceeds.

controller:willUpdateObject:inDataSource:

- (BOOL)controller:(EOController *)controller
    willUpdateObject:anEO
    inDataSource:aDataSource Sent from saveToDataSource to inform the delegate that controller will update anEO in aDataSource. If the delegate returns NO the update isn't performed (though saveToDataSource continues for other operations); if the delegate returns YES the update proceeds.

Appendix C

Enterprise Objects Framework Release 1.0 Copyright ©1994 by NeXT Computer, Inc. All Rights Reserved.

EOAssociation

| | |
|---|---|
| Inherits From: | NSObject |
| Conforms To: | EOAssociationNotification |
| Declared In: | eointerface/EOAssociation.h |

Class Description

EOAssociation is an abstract class defining the link between an EOController, which manages a collection of data-bearing enterprise objects, and a single user interface element, such as a column in an NXTableView, or a control. An EOAssociation coordinates the display and editing of property values for its controller's enterprise objects. EOAssociations can also link two controllers (see the EOQualifiedAssociation class specification for more information).

An EOAssociation links just one property of the objects supplied by its EOController to its user interface object. This property is identified by a key as used in the access layer's EOKeyValueCoding informal protocol. An association for a user interface object capable of displaying multiple enterprise objects (such as an NXTableView) displays data for all objects in the controller, while an association for a user interface object capable of displaying only one enterprise object (such as a TextField) displays data for the first selected object in the controller.

An EOAssociation is notified of changes in its controller through the EOAssociationNotification protocol. Upon receiving notice of a change, the association determines which objects it needs to display values for and sends each a valuesForKeys: message with an array containing the key for the association's property. The association then updates the user interface object with the value returned if it's different from the current value.

If the EOAssociation's user interface object changes, then the EOAssociation must send that change to its controller. EOAssociations usually set themselves up as the targets of control object so that they're notified of such changes. For example, when a user edits a TextField representing the name of an enterprise object and presses Return, the TextField sends its association an action message. The EOAssociation then gets the new value in the TextField and informs its controller that the user interface object changed by sending the controller an associationDidEdit: message. In response to this notification the controller sends a value message to the association to get the new value for the enterprise object.

For more information on how EOAssociations work with EOControllers and user interface objects, see the EOController class specification and the EOAssociationNotification protocol specification. For information on associations for a specific destination class, see one of the following class specifications:

| Association Subclass | Destination Object Class |
|---|---|
| EOActionCellAssociation | Any ActionCell subclass (such as TextFieldCell) |
| EOBrowserAssociation | NXBrowser |
| EOButtonAssociation | Button |
| EOColumnAssociation | NXTableVector (in an NXTableView) |
| EOControlAssociation | *See below* |
| EOImageAssociation | NXImageView |
| EOMatrixAssociation | Matrix (*but see below*) |
| EOPopUpAssociation | PopUpList |

| | |
|---|---|
| EOQualifiedAssociation | EOController |
| EOTextAssociation | Text |

EOControlAssociation can be used with any "simple" control that manages a single value, such as a TextField or a Slider. However, if a control has a dedicated association subclass, you should use that. For example, Buttons should be linked with instances of EOButtonAssociation.

Note: EOMatrixAssociation has very limited functionality. If you want to create associations with individual items in a matrix (especially with fields in a Form object), use EOActionCellAssociation.

Although the interface of any association contains only a few methods, their implementations are often highly dependent on one another and on the way the destination objects act. Because of this, if you need to create an association class for a custom user interface object class, you should create it as an immediate subclass of EOAssociation.

Instance Variables

None declared in this class.

Adopted Protocols

| | |
|---|---|
| EOAssociationNotification | – contentsDidChange |
| | – selectionDidChange |
| | – discardEdits |
| | – endEditing |

Method Types

| | |
|---|---|
| Initializing new instances | – initWithController:key:destination: |
| Getting association members | – controller |
| | – destination |
| Getting the key and value | – key |
| | – value |

Instance Methods controller

– (EOController *)controller

Returns the EOController responsible for the association.

destination

– destination

Returns the object that the association monitors. This is typically a user interface object, but doesn't have to be.

InitWithController:key:destination:

– InitWithController:(EOController *)*aController*
  key:(NSString *)*aKey*
  destination:*destination*

Initializes a newly allocated EOAssociation with *aController*. *aKey* is the name of the property represented by the association, and is used as the identifier for value transfers to and from *destination* (typically a user interface object or another EOController). This is the designated initializer for the EOAssociation class. Returns self.

See also: – addAssociation: (EOController)

key

– (NSString *)key

Returns the name of the property that the association transfers to and from its destination.

value

– value

Returns the value of the association's destination as an instance of an appropriate value class (see "Mapping from Database to Objects" in the access layer's EOAttribute class specification). For example, the value class for a TextField's value is NSString.

For applications using the access layer, if the value class specified for an enterprise object's attribute in the EOModel isn't NSString or NSData, it must match exactly the value class used by the association.

See also: – key, – takeValuesFromDictionary: (EOKeyValueCoding informal protocol)

Enterprise Objects Framework Release 1.0 Copyright ©1994 by NeXT Computer, Inc. All Rights Reserved.

EOActionCellAssociation

Inherits From: EOControlAssociation : EOAssociation : NSObject

Conforms To: EOAssociationNotification (EOAssociation)

Declared In: eointerface/EOControlAssociation.h

Class Description

EOActionCellAssociation is an association that works with an individual cell of a control such as a Matrix. A cell association is needed because a control offers only a single text delegate for all of its cells, but an association linked with a cell needs to know when its own cell has finished editing. If you set up several EOActionCellAssociations with a Matrix, for example, only one can be the text delegate, making it difficult for another to be notified when its cell ends editing. To avert this problem, EOActionCellAssociations register themselves globally according to their destination cells. When their control object ends editing, the association registered as the control's text delegate looks up the association for the control's selected cell and propagates the notification to it.

Although the interface of any association contains only a few methods, various implementations are often highly dependent on one another and on the way the destination objects act. Because of this, if you need to create an association class for a custom subclass of ActionCell, you should create it as an immediate subclass of EOAssociation.

Instance Variables

None declared in this class.

Instance Methods

None declared in this class.

Enterprise Objects Framework Release 1.0 Copyright ©1994 by NeXT Computer, Inc. All Rights Reserved.

EOColumnAssociation

Inherits From: EOAssociation : NSObject

Conforms To: EOAssociationNotification (EOAssociation)

Declared In: cointerface/EOColumnAssociation.h

Class Description

An EOColumnAssociation displays and edits a column of an NXTableView containing the values for its key of all enterprise objects in its controller. You can hook up any number of column associations to a single NXTableView, as long as they all have the same controller.

However, because an NXTableView expects to have only a single object acting as its data source (not to be confused with the controller's data source), one of the column associations must step forward to play that role. The column associations for a particular controller and NXTableView know to rendezvous under this lead association, which uses itself and its cohorts as column identifiers and forwards requests for data access to the appropriate association.

Although the interface of any association contains only a few methods, various implementations are often highly dependent on one another and on the way the destination objects act. Because of this, if you need to create an association class for a custom subclass of NXTableVector, you should create it as an immediate subclass of EOAssociation.

Edit Buffering

Because an NXTableView doesn't store data on its own, EOColumnAssociations have to cache their edited values (in other words, buffered edits not yet sent to the controller). When asked to get a value for a particular index, the association asks its controller for the enterprise object at that index and looks for a value cached under that object. Only if it doesn't find one does it ask the enterprise object for its value. When the controller saves to objects, all of its column associations (and any other associations that buffer edits) are sent discardEdits messages telling them to purge their cached values.

Setting up an EOColumnAssociation

When setting up an EOColumnAssociation programmatically, you must configure the newly initialized association by sending it a setTableView: message with the NXTableView of the destination column as an argument. This method sets the association up as the NXTableView's data source and delegate if needed. See the method description for more information.

Instance Variables

None declared in this class.

Enterprise Objects Framework Release 1.0 Copyright ©1994 by NeXT Computer, Inc. All Rights Reserved.

EOControlAssociation

| | |
|---|---|
| Inherits From: | EOAssociation : NSObject |
| Conforms To: | EOAssociationNotification (EOAssociation) |
| Declared In: | eointerface/EOControlAssociation.h |

Class Description

EOControlAssociation is the default association for all subclasses of Control except Button, Form, Matrix, NXBrowser, and NXImageView. It sets its control's value with setStringValue: and gets its control's value by invoking stringValue. A control association thus work wells with any "simple" control that displays only a single value, such as a TextField or Slider.

A control association sets itself up as the target of its destination control, and, if that control responds to the setTextDelegate: message, as the control's text delegate. This allows a control association to notify its controller of an edit whenever its control sends an action message and whenever its control ends editing (for example, by the user pressing Tab or Return, or selecting another text field).

Although the interface of any association contains only a few methods, their implementations are often highly dependent on one another and on the way the destination objects act. Because of this, if you need to create an association class for a custom subclass of Control, you should create it as an immediate subclass of EOAssociation.

Instance Variables

None declared in this class.

Instance Methods

None declared in this class.

Enterprise Objects Framework Release 1.0 Copyright ©1994 by NeXT Computer, Inc. All Rights Reserved.

EOImageAssociation

Inherits From:  EOAssociation : NSObject

Conforms To:  EOAssociationNotification (EOAssociation)

Declared In:  eointerface/EOImageAssociation.h

Class Description

An EOImageAssociation uses an NXImageView to display an NXImage for the appropriate key of its controller's selected object, and sets a new image for that object when one is dragged over the NXImageView.

Although the interface of any association contains only a few methods, various implementations are often highly dependent on one another and on the way the destination objects act. Because of this, if you need to create an association class for a custom subclass of NXImageView, you should create it as an immediate subclass of EOAssociation.

Instance Variables

None declared in this class.

Instance Methods

None declared in this class.

Enterprise Objects Framework Release 1.0 Copyright ©1994 by NeXT Computer, Inc. All Rights Reserved.

EOMatrixAssociation

| | |
|---|---|
| Inherits From: | EOAssociation : NSObject |
| Conforms To: | EOAssociationNotification (EOAssociation) |
| Declared In: | eointerface/EOMatrixAssociation.h |

Class Description

An EOMatrixAssociation manages a Matrix of ButtonCells as a selection list, adding cells for every object in its controller and displaying the values for its key. To work properly with a matrix association, a Matrix should use ButtonCells of type NX_ONOFF, have a mode of NX_RADIOMODE, and be contained in a ScrollView. This configuration allows you to use the Matrix to select a single object at a time.

EOBrowserAssociation offers a more flexible selection list than EOMatrixAssociation, since an NXBrowser can allow empty and multiple selections in addition to the usual one object at a time. A browser-based selection list is also easier to set up, since there's no extra configuration to do beyond connecting the association.

Although the interface of any association contains only a few methods, various implementations are often highly dependent on one another and on the way the destination objects act. Because of this, if you need to create an association class for a custom subclass of Matrix, you should create it as an immediate subclass of EOAssociation.

Instance Variables

None declared in this class.

Instance Methods

None declared in this class.

Enterprise Objects Framework Release 1.0 Copyright ©1994 by NeXT Computer, Inc. All Rights Reserved.

EOPopUpAssociation

| | |
|---|---|
| Inherits From: | EOAssociation : NSObject |
| Conforms To: | EOAssociationNotification (EOAssociation) |
| Declared In: | eointerface/EOPopUpAssociation.h |

Class Description

An EOPopUpAssociation uses a popup list to display the value of an enterprise object for its key, and notifies its controller when the user chooses a new item in the popup list. To set up a popup association, you have to create the popup list in Interface Builder and manually populate it with items representing the possible values for the association's key. You then form the association from the controller to the popup list's button.

When the association is notified of a change by its controller, it gets the value of the first selected enterprise object and looks for a matching string value in the popup list's items. If it finds an item equal to the enterprise object's value, it has the popup list select that item. If it doesn't find an item with the value, it temporarily creates an extra item with that value, adds it to the bottom of the popup list, and has the popup list select it. The next time the association is notified of a change in selection or contents by its controller, it removes the temporary item from the popup list. By temporarily adding items to its popup list the association guarantees that the right thing is displayed even for a value outside the set of "legal" values.

When the user selects an item in the popup list, the association simply sends an associationDidEdit: message to its controller. An EOPopUpAssociation's value is the string value of the selected item in the popup list, so this item will be used as the new value for the enterprise object. Note that if a temporary item was added to the popup list, it's immediately removed if the user chooses a different one.

Although the interface of any association contains only a few methods, various implementations are often highly dependent on one another and on the way the destination objects act. Because of this, if you need to create an association class for a custom subclass of PopUpList, you should create it as an immediate subclass of EOAssociation.

Instance Variables

None declared in this class.

Instance Methods

None declared in this class.

Enterprise Objects Framework Release 1.0 Copyright ©1994 by NeXT Computer, Inc. All Rights Reserved.

EOQualifiedAssociation

| | |
|---|---|
| Inherits From: | EOAssociation : NSObject |
| Conforms To: | EOAssociationNotification (EOAssociation) |
| Declared In: | eointerface/EOQualifiedAssociation.h |

Class Description

The EOQualifiedAssociation class implements associations between EOControllers. Often several elements in the user interface are linked through a master-detail relationship. EOQualifiedAssociations establish these links. When an EOController receives a saveToObjects, saveToDataSource, or redisplay message, it not only propagates that action to its next controller, but it also checks each association to see if its destination can perform that action, in which case it also propagates the action to the association's destination. The destination doesn't have to be linked through an EOQualifiedAssociation, though; it merely has to respond to the appropriate messages and have some kind of association that works properly with it.

When an EOQualifiedAssociation receives a contentsDidChange or selectionDidChange from its controller (the master), it needs to requalify its destination controller (the detail). It does this by getting the selected object from the master controller and using qualifyWithRelationshipKey:ofObject: (described in the EOQualifiableDataSources protocol specification) to qualify the data source of its destination controller with the association key and the selected object, and then having the destination controller fetch to update its display. A detail controller can meaningfully display values only when exactly one object is selected in the master; if the master controller doesn't have exactly one object selected, the association passes nil as the object to qualify for, which disables the detail controller.

It's possible for an EOQualifiedAssociation to be set up with a detail controller that doesn't yet have a data source. In this case the association will get a detail data source from the master by sending it a dataSourceQualifiedByKey: message (described in the EOMasterDataSources protocol specification). It then assigns the new data source to the detail controller by sending it a setDataSource: message.

Instance Variables

None declared in this class.

Instance Methods

None declared in this class.

Instance Methods setTableView:

— (void)setTableView:(NXTableView *)*aTableView*

If *aTableView* doesn't already have a column association from the same controller as its data source, sets up the receiver as the data source and delegate, so that it acts on behalf of all other column associations tied to *aTableView*. You should always send this message to a column association that you create programmatically.

tableView

— (NXTableView *)tableView

Returns the NXTableView containing the destination column of the association.

Enterprise Objects Framework Release 1.0 Copyright ©1994 by NeXT Computer, Inc. All Rights Reserved.

EOTextAssociation

| | |
|---|---|
| Inherits From: | EOAssociation |
| Conforms To: | EOAssociationNotification (EOAssociation) |
| Declared In: | eointerface/EOTextAssociation.h |

Class Description

An EOTextAssociation manages a Text object, and is capable of handling display of ASCII, RTF, and serialized RTF with attachments (RTFD). A text association monitors any editing done to the Text object, and when the Text object ends editing (for example, if the user presses Enter), the text association informs its controller.

When a text association is notified of a change by its controller, it gets the value of the first selected enterprise object as raw character data and examines it for an RTF or RTFD signature. The association then sends the appropriate message to its Text object for the format, allowing the Text object to properly display the value regardless of the format.

When asked for its value, however, a text association returns an NSString (NSData for RTFD) containing the text in whatever format its Text object uses:

| Text Capability | Text Format |
|---|---|
| Single font | Plain text in an NSString object |
| Multiple fonts allowed | RTF in an NSString object |
| Graphics allowed | RTFD in an NSData object |

This can cause problems if you associate a key whose corresponding value is of one type (such as plain text) with a Text object configured to edit another type (such as RTF). In this case the enterprise objects receive text in a format they may not be able to handle. You should always take care to match the text formats of the values you intend to display with the configuration of the Text object.

Although the interface of any association contains only a few methods, various implementations are often highly dependent on one another and on the way the destination objects act. Because of this, if you need to create an association class for a custom subclass of Text, you should create it as an immediate subclass of EOAssociation.

Instance Variables

None declared in this class.

Instance Methods

None declared in this class.

Appendix D

Enterprise Objects Framework Release 1.0 Copyright ©1994 by NeXT Computer, Inc. All Rights Reserved.

EOAssociationNotification

Adopted By: EOAssociation

Declared In: eointerface/EOController.h

Protocol Description

The EOAssociationNotification protocol declares methods sent by an EOController to tell its EOAssocations about changes to its enterprise objects. Whenever an object is modified by a controller, whether by being inserted, deleted, or updated, the controller sends each of its EOAssociations a contentsDidChange message, allowing the association to display any new values. If the change to the controller also involves a change of selection, it sends selectionDidChange to each association, so that the association can display values for the proper object, or highlight the selected objects if its user interface object displays multiple values.

The controller also informs its associations when an operation it's performing would invalidate any cached values for the user interface objects. When the controller saves or discards its buffered edits, it renders any edited values cached by its associations irrelevant—and so it sends each association a discardEdits message. For example, an NXTableView doesn't actually store the values it displays, but gets them through another object, such as an EOColumnAssociation. The association object actually stores any edited values for the column, and discardEdits informs the association that the cached values it has are no longer applicable.

Any other operation the controller performs—fetching, inserting a new object, setting an undo mark—requires editing of a user interface object to end. In this case, the controller sends endEditing to each of its associations, so that they can finish editing, reclaim any shared resources (such as a window's field editor), and notify the controller with associationDidEdit:.

Implementing the EOAssociationNotification Protocol

The descriptions in this specification provide all the details of what the methods should do, but there are a few issues in implementing them that you need to be aware of. Because an association not only receives messages from its controller, but sends them to its controller as well, a recursive loop could result if your association subclass sends messages back to its controller from one of the notification methods of this protocol. For example, if your association needs to alter the controller's selection in its own selectionDidChange message, it will be sent another selectionDidChange message while still handling the first. You should either implement your association not to affect the controller's selection or values, or you should devise a mechanism for preventing the association notification methods from being recursively invoked.

Another slight consideration stems from the intimate relationship between an association and its user interface object. An association is usually so simple, and its implementation so tied to the specific behavior of its user interface object class, that it's usually easier to implement a new association as a subclass of EOAssociation rather than one of its subclasses.

Method Types

| | |
|---|---|
| Synchronizing values | – contentsDidChange |
| | – selectionDidChange |
| Handling edits | – discardEdits |
| | – endEditing |

Instance Methods contentsDidChange

– (void)contentsDidChange

Sent to an EOAssociation by its controller whenever the controller's objects have changed; for example, when an object is edited, inserted, or deleted, or when the controller performs a fetch operation. The association should determine whether any values it's responsible for have changed, and if so should update its user interface object.

An association may be sent both a contentsDidChange and a selectionDidChange method for a single change in the controller. For example, if a selected object is deleted, both the contents and the selection change.

discardEdits

– (void)discardEdits

An EOController sends this method to its controllers before fetching, to notify them that any edited values they cache for their user interface objects should be disposed of.

endEditing

– (void)endEditing

Informs the EOAssociation that it should formally end any editing in its user interface object and inform the controller of any pending edit by sending associationDidEdit:. This also usually results in the user interface object resigning first responder.

See also: – endEditingFor: (Window class of the Application Kit)

selectionDidChange

– (void)selectionDidChange

Sent to an EOAssociation by its controller whenever the controller's selection indexes have changed. The association should have its user interface object redisplay itself to reflect the change in selection. For a user interface object that displays a single value, the association sets that object's value to the property value for the first selected object in the controller. For a user interface object that displays multiple values, the association has the object highlight its values in accordance with the selection.

An association may be sent both a contentsDidChange and a selectionDidChange method for a single change in the controller. For example, if a selected object is deleted, both the contents and the selection change.

Appendix E

```
// We provide a default implementation of the Key-Value Coding Protocol
// on the root class in the NEXTSTEP object hierarchy, NSObject. All
// classes inheriting from NSObject will automatically get this
// implementation. However, classes may override this behavior by
// implementing their own versions of takeValuesFromDictionary and/or
// valuesForKeys.
@interface NSObject (KeyValueCoding)
- takeValuesFromDictionary:(Dictionary *)valueDictionary;
- (Dictionary *)valuesForKeys:(Array *)keyArray;
@end @implementation NSObject (KeyValueCoding)
// Aggregate versions added to the root object class
- takeValuesFromDictionary:valueDictionary
{
   for each key and value in dictionary do {
      [self takeValue:value forKey:key];
   }
}

- (Dictionary *)valueForKeys:keyArray
{
   id resultDictionary = [Dictionary new];
   for each key in keyArray {
      value = [self valueForKey:key];
      [resultDictionary setValue:value forKey:key];
   }
   return resultDictionary;
}

// single value versions
- takeValue:value forKey:key
{
  classInfo = [self getClassInfo];

// look if they have method of name "set<KeyName>"
  methodInfo = [classInfo lookupMethodNamed:"set"+key];
  if (methodInfo) {
    type = getArgumentType
    switch (type) {
    OBJECT:
        [self callMethodNamed:"set"+key withArgument:value];
    FLOAT:
        [self callMethodNamed:"set"+key withArgument:[value floatValue]];
    All other types...
    }
  } else {
    // look for instance variable
    instanceVariableInfo = [classInfo lookupInstanceVariableNamed:key];
    if (instanceVariableInfo) {
      type = [instanceVariableType];
      // perform assignment to instance variable
      offsetOfVariable = [instanceVariableInfo offset];
```

```
            switch (type) {
              OBJECT:
                *(id)(self + offsetOfVariable) = valueToAssign;
                break;
              FLOAT:
                *((float *)(self + offsetOfVariable)) = [value floatValue];
                break;
              All other types...
            }
        }
      }
    }

- valueForKey:key
{
    // like takeValue:forKey except backwards.. ;-) I.e.:
    classInfo = [self getClassInfo];

// look if they have method with the same name as the key.
    // e.g. "firstName"
    methodInfo = [classInfo lookupMethodNamed:key];
    if (methodInfo) {
      type = getArgumentType
      switch (type) {
        OBJECT:
            return [self callMethodNamed:key];
        FLOAT:
            // this method actually returns a C scalar numeric type, not an
            // object, so we have to put an "object wrapper" around the value
            // returned.
            return [NSNumber numberWithFloat:(float)[self
                        callMethodNamed:key];
        All other types...
      }
    } else {
      // look for instance variable
      instanceVariableInfo = [classInfo lookupInstanceVariableNamed:key];
      if (instanceVariableInfo) {
        type = [instanceVariableType];
          // perform assignment to instance variable
          offsetOfVariable = [instanceVariableInfo offset];
          switch (type) {
            OBJECT:
               return *(id)(self + offsetOfVariable);
               break;
            FLOAT:
               // this variable is actually a C scalar numeric type, not an
               // object, so we have to put an "object wrapper" it.
               return [NSNumber numberWithFloat:
                        *((float *)(self + offsetOfVariable))];
               break;
            All other types...
          }
      }
    }
}
```

The actual implementation of the above caches the state necessary to perform a get or set operation in a "binding" object; The actual scanning of class information only occurs the first time a get or set operation is performed for a particular key.

@end

We claim:

1. In an object oriented programming environment, a method for associating a controlling object managing one or more data bearing objects with a plurality of user interface object types comprising the steps of:

defining a first type of association object for a first type of user interface object, said first type of association object being capable of receiving standard messages from said controlling object and converting said received standard messages to messages specific to said first type of user interface object and sending said resulting messages specific to said first type of user interface object to said first type of user interface object, said first type of association object further being capable of receiving messages specific to said first type of user interface object from said first type of user interface object and converting said received messages specific to said first type of user interface object to standard messages and sending said resulting standard messages to said controlling object;

creating a first instance of said first type of user interface object;

creating a first instance of said first type of association object;

providing said first instance of said first type of association object with a key for obtaining data from a data bearing object;

linking said first instance of said first type of association object with said first instance of said first type of user interface object and said controlling object such that in response to a standard message received from said controlling object said first instance of said first type of association object converts said standard message to a message specific to said first type of user interface object and sends the resulting message specific to said first type of user interface object to said first instance of said first type of user interface object and in response to receiving from said first instance of said first type of user interface object a message specific to said first type of user interface object said first instance of said first type or association object converts said message specific to said first type of user interface object to a standard message and sends the resulting standard message to said controlling object.

2. The method of claim 1 further comprising the steps of:

defining a second type of association object for a second type of user interface object, said second type of association object being capable of receiving standard messages from said controlling object and converting said received standard messages to messages specific to said second type of user interface object and sending said resulting messages specific to said second type of user interface object to said second type of user interface object, said second type of association object further being capable of receiving messages specific to said second type of user interface object from said second type of user interface object and converting said received messages specific to said second type of user interface object to standard messages and sending said resulting standard messages to said controlling object;

creating a first instance of said second type of user interface object;

creating a first instance of said second type of association object;

providing said first instance of said second association object with a key for obtaining data from a data bearing object;

linking said first instance of said second type of association object with said first instance of said second type of user interface object and said controlling object such that in response to a standard message received from said controlling object said first instance of said second type of association object converts said standard message to a message specific to said second type of user interface object and sends the resulting message specific to said second type of user interface object to said first instance of said second type of user interface object and in response to receiving from said first instance of said second type of user interface object a message specific to said second type of user interface object said first instance of said second type of association object converting said message specific to said second type of user interface object to a standard message and sending the resulting standard message to said control object.

3. The method of claim 1 further comprising the steps of:

creating a second instance of said first type of user interface object;

creating a second instance of said first type of association object;

providing said second instance of said first type of association object with a key for obtaining data from a data bearing object;

linking said second instance of said first type of association object with said second instance of said first type of user interface object and said controlling object such that in response to a standard message received from said controlling object said second instance of said first type of association object converts said standard message received from said controlling object to a message specific to said first type of user interface object and sends the resulting message specific to said first type of user interface object to said second instance of said first type of user interface object and in response to receiving from said second instance of said first type of user interface object a message specific to said first type of user interface object said second instance of said first type of association object converts said message specific to said first type of user interface object to a standard message and sends the resulting standard message to said controlling object.

4. The method of claim 1 wherein standard messages sent by said controlling object to association objects comprise a message for conveying a current value of data contained in a data bearing object.

5. The method of claim 1 wherein standard messages sent by said controlling object to association objects comprise a message for indicating that data contained in a data bearing object has changed.

6. The method of claim 1 wherein standard messages received by said controlling object from association objects comprise a message for indicating that a data value displayed in a user interface object has been edited.

7. The method of claim 1 wherein standard messages received by said controlling object from association objects comprise a message for conveying a current value of data displayed in a user interface object.

8. The method of claim 1 wherein standard messages sent by said controlling object to association objects comprise a message for requesting a current value of data displayed in a user interface object.

9. The method of claim 8 wherein data is stored in said user interface object in the form of a key-value pair and said message for requesting a current value of data displayed by a data bearing object comprises a key for identifying data contained in said user interface object.

10. The method of claim 1 wherein standard messages received by said controlling object from association objects comprise a message for requesting a current value of data contained in a data bearing object.

11. The method of claim 10 wherein data is stored in said data bearing object in the form of a key-value pair and said message for requesting a current value of data contained in a data bearing object comprises said key provided to said association object.

12. A method for displaying data contained in data bearing objects on a user interface in an object oriented programming environment comprising the steps of:

providing a controlling object for managing a plurality of data bearing objects;

providing a plurality of types of user interface objects for displaying data on a user interface;

for each type of user interface object, providing a corresponding type of association object capable of receiving standard messages from said controlling object and converting said received standard messages to messages specific to said type of user interface object and sending said resulting messages specific to said type of user interface object to said type of user interface object, said corresponding type of association object further being capable of receiving messages specific to said type of user interface object from said type of user interface object and converting said received messages specific to said type of user interface object to standard messages and sending said resulting standard messages to said controlling object;

providing means for providing an instance of an association object with a key for obtaining data from a data bearing object;

providing means to link an instance of a type of association object with an instance of a corresponding type of user interface object and a controlling object such that in response to a standard message received from said controlling object said instance of said type of association object converts said standard message to a message specific to said corresponding type of user interface object and sends the resulting message specific to said corresponding type of user interface object to said instance of said corresponding type of user interface object and in response to receiving from said instance of said corresponding type of user interface object a message specific to said corresponding type of user interface object said instance of said type of association object converts said message specific to said type of user interface object to a standard message and sends the resulting standard message to said controlling object.

13. The method of claim 12 wherein standard messages sent by said controlling object to association objects comprise a message for conveying a current value of data contained in a data bearing object.

14. The method of claim 12 wherein standard messages sent by said controlling object to association objects comprise a message for indicating that data contained in a data bearing object has changed.

15. The method of claim 12 wherein standard messages received by said controlling object from association objects comprise a message for indicating that a data value displayed in a user interface object has been edited.

16. The method of claim 12 wherein standard messages received by said controlling object from association objects comprise a message for conveying a current value of data displayed in a user interface object.

17. The method of claim 12 wherein standard messages sent by said controlling object to association objects comprise a message for requesting a current value of data displayed in a user interface object.

18. The method of claim 17 wherein data is stored in said user interface object in the form of a key-value pair and said message for requesting a current value of data displayed by a data bearing object comprises a key for identifying data contained in said user interface object.

19. The method of claim 12 wherein standard messages received by said controlling object from association objects comprise a message for requesting a current value of data contained in a data bearing object.

20. The method of claim 19 wherein data is stored in said data bearing object in the form of a key-value pair and said message for requesting a current value of data contained in a data bearing object comprises a key for identifying data contained in said data bearing object.

21. The method of claim 12 wherein said plurality of types of user interface objects includes a table column type of a user interface object.

* * * * *